United States Patent
Lee et al.

(10) Patent No.: US 12,004,128 B2
(45) Date of Patent: Jun. 4, 2024

(54) METHOD AND APPARATUS FOR SUPPORTING BANDWIDTH PART BASED OPERATIONS IN SIDELINK COMMUNICATION

(71) Applicant: ELECTRONICS AND TELECOMMUNICATIONS RESEARCH INSTITUTE, Daejeon (KR)

(72) Inventors: Jung Hoon Lee, Daejeon (KR); Cheul Soon Kim, Daejeon (KR); Sung Hyun Moon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/226,923

(22) Filed: Jul. 27, 2023

(65) Prior Publication Data
US 2023/0371008 A1    Nov. 16, 2023

Related U.S. Application Data

(62) Division of application No. 17/246,826, filed on May 3, 2021, now Pat. No. 11,758,518.

(30) Foreign Application Priority Data

May 15, 2020  (KR) .................. 10-2020-0058579
Jun. 16, 2020  (KR) .................. 10-2020-0073097

(Continued)

(51) Int. Cl.
*H04W 72/04*  (2023.01)
*H04W 76/27*  (2018.01)

(52) U.S. Cl.
CPC .......... *H04W 72/04* (2013.01); *H04W 76/27* (2018.02)

(58) Field of Classification Search
CPC . H04W 72/04; H04W 72/0453; H04W 76/27; H04W 76/14; H04L 5/0091; H04L 5/001; H04L 27/2602; H04L 27/26025
See application file for complete search history.

(56) References Cited

U.S. PATENT DOCUMENTS

2018/0324806 A1   11/2018   Yu et al.
2019/0104543 A1    4/2019   Park
(Continued)

FOREIGN PATENT DOCUMENTS

EP    3934152 A1 *  1/2022  ............. H04L 5/001
WO   2020/060205 A1   3/2020

*Primary Examiner* — Farid Seyedvosoghi
(74) *Attorney, Agent, or Firm* — LRK PATENT LAW FIRM

(57) ABSTRACT

Disclosed are methods and apparatuses for supporting BWP-based operations in sidelink communication. An operation method of a first terminal in a communication system may include receiving, from a base station, configuration information of a mapping relationship between an uplink (UL) bandwidth part (BWP) and a sidelink (SL) BWP; when a UL switching operation for the UL BWP is performed, performing an SL switching operation for the SL BWP mapped to the UL BWP based on the mapping relationship without separate signaling indicating execution of the SL switching operation; and performing sidelink communication with a second terminal in a switched SL BWP.

10 Claims, 14 Drawing Sheets

(30) Foreign Application Priority Data

Aug. 7, 2020 (KR) ........................ 10-2020-0099287
Apr. 23, 2021 (KR) ........................ 10-2021-0053131

(56) References Cited

U.S. PATENT DOCUMENTS

| | | |
|---|---|---|
| 2019/0132110 A1 | 5/2019 | Zhou et al. |
| 2019/0191421 A1 | 6/2019 | Li et al. |
| 2019/0261406 A1 | 8/2019 | Kim et al. |
| 2020/0021407 A1 | 1/2020 | Abdoli et al. |
| 2020/0053768 A1 | 2/2020 | Chen et al. |
| 2020/0328864 A1* | 10/2020 | Choi ..................... H04L 5/0094 |
| 2021/0243609 A1* | 8/2021 | Lei ........................ H04L 5/0057 |

* cited by examiner

400

RMSI CORESET mapping pattern #1

RMSI CORESET mapping pattern #2

RMSI CORESET mapping pattern #3

METHOD AND APPARATUS FOR SUPPORTING BANDWIDTH PART BASED OPERATIONS IN SIDELINK COMMUNICATION

CROSS-REFERENCE TO RELATED APPLICATIONS

This application is a division of U.S. patent application Ser. No. 17/246,826, filed on May 3, 2021, which claims priority to Korean Patent Applications No. 10-2020-0058579 filed on May 15, 2020, No. 10-2020-0073097 filed on Jun. 16, 2020, No. 10-2020-0099287 filed on Aug. 7, 2020, and No. 10-2021-0053131 filed on Apr. 23, 2021 with the Korean Intellectual Property Office (KIPO), the entire contents of which are hereby incorporated by reference.

BACKGROUND

1. Field of the Invention

The present disclosure relates to a sidelink communication technique in a communication system, and more specifically, to a technique for supporting operations based on multiple bandwidth parts (BWPs).

2. Description of Related Art

The communication system (e.g., a new radio (NR) communication system) using a higher frequency band (e.g., a frequency band of 6 GHz or above) than a frequency band (e.g., a frequency band of 6 GHz or below) of the long term evolution (LTE) communication system (or, LTE-A communication system) is being considered for processing of soaring wireless data. The NR system may support not only a frequency band of 6 GHz or below, but also a frequency band of 6 GHz or above, and may support various communication services and scenarios compared to the LTE system. In addition, requirements of the NR system may include enhanced Mobile BroadBand (eMBB), Ultra Reliable Low Latency Communication (URLLC), and Massive Machine Type Communication (mMTC).

Sidelink communication may be performed in the NR system. The sidelink communication may be performed using one or more bandwidth parts (BWPs). For example, sidelink signals and/or data may be transmitted and received within a BWP configured for sidelink communication. In order to support this operation, there is a need for methods for supporting BWP-based operations in sidelink communication.

SUMMARY

Accordingly, exemplary embodiments of the present disclosure are directed to providing methods and apparatuses for supporting operations based on multiple bandwidth parts (BWPs) in sidelink communication.

According to a first exemplary embodiment of the present disclosure, an operation method of a first terminal in a communication system may comprise: receiving, from a base station, configuration information of a mapping relationship between an uplink (UL) bandwidth part (BWP) and a sidelink (SL) BWP; when a UL switching operation for the UL BWP is performed, performing an SL switching operation for the SL BWP mapped to the UL BWP based on the mapping relationship without separate signaling indicating execution of the SL switching operation; and performing sidelink communication with a second terminal in a switched SL BWP.

The configuration information may be included in system information or a terminal-specific radio resource control (RRC) message transmitted from the base station.

The same subcarrier spacing (SCS) may be applied to the UL BWP and the SL BWP having the mapping relationship.

When an SL resource is configured within a switched UL BWP, the SL resource may be configured after a preconfigured time from a completion time of the UL switching operation to ensure UL transmission in the switched UL BWP.

When an SL resource is configured within a switched UL BWP, the SL resource may be configured from a completion time of the UL switching operation, and an SL resource configured until a preconfigured time from the completion time of the UL switching operation may be ignored to ensure UL transmission in the switched UL BWP.

When an SL resource is configured independently of a UL resource, the sidelink communication in the switched SL BWP and uplink communication in a switched UL BWP may be simultaneously performed.

When an SL resource is configured independently of a UL resource, the uplink communication may be preferentially performed from the completion time of the UL switching operation to a preconfigured time (e.g., preconfigured duration) to ensure the uplink communication.

The operation method may further comprise, when an activation operation for the UL BWP is performed, performing an activation operation for the SL BWP mapped to the UL BWP based on the mapping relationship.

The operation method may further comprise, when a deactivation operation for the UL BWP is performed, performing a deactivation operation for the SL BWP mapped to the UL BWP based on the mapping relationship.

An SL resource pool may be configured based on a reference BWP, and when a first numerology of the reference BWP is different from a second numerology of the SL BWP, the SL resource pool may be applied to the SL BWP in consideration of a ratio between the first numerology and the second numerology.

According to a second exemplary embodiment of the present disclosure, an operation method of a base station in a communication system may comprise: configuring a mapping relationship between an uplink (UL) bandwidth part (BWP) and a sidelink (SL) BWP; transmitting configuration information of the mapping relationship to a terminal; performing a UL switching operation for the UL BWP; and performing uplink communication with the terminal in a switched UL BWP, wherein an SL switching operation for the SL BWP is triggered by performing the UL switching operation.

The configuration information may be included in system information or a terminal-specific radio resource control (RRC) message transmitted from the base station.

The same subcarrier spacing (SCS) may be applied to the UL BWP and the SL BWP having the mapping relationship.

When an SL resource is configured within a switched UL BWP, the SL resource may be configured after a preconfigured time from a completion time of the UL switching operation to ensure UL transmission in the switched UL BWP.

According to a third exemplary embodiment of the present disclosure, an operation method of a first terminal in a communication system may comprise: generating sidelink control information (SCI) including a first indicator indicating execution of a sidelink (SL) switching operation of an SL bandwidth part (BWP); transmitting the SCI to a second terminal; performing the SL switching operation based on the first indicator included in the SCI; and performing sidelink communication with the second terminal in a switched SL BWP.

The operation method further comprise, when the sidelink communication is performed based on a mode 1, receiving downlink control information (DCI) including the first indicator from a base station.

When the sidelink communication is performed based on a mode 2, whether to perform the SL switching operation may be autonomously determined by the first terminal.

The SCI further may include a slot offset, and the slot offset may be an offset between a slot in which the SCI is transmitted and a slot in which the sidelink communication associated with the SCI is performed.

The SCI may further include a subchannel offset, and the subchannel offset may be an offset between a subchannel in which the SCI is transmitted and a first subchannel in which the sidelink communication associated with the SCI is performed.

The operation method may further comprise receiving an offset indicating an execution time of the SL switching operation from the base station, wherein the SL switching operation may be performed in a slot after the offset from a slot in which the SCI is received.

An SL resource pool may be configured based on a reference BWP, and when a first numerology of the reference BWP is different from a second numerology of the SL BWP, the SL resource pool may be applied to the SL BWP in consideration of a ratio between the first numerology and the second numerology.

According to the present disclosure, a mapping relationship between UL BWP and SL BWP may be configured, and when a switching operation (or activation operation or deactivation operation) of a UL BWP is performed, a corresponding switching operation (or activation operation or deactivation operation) of an SL BWP mapped to the UL BWP may be performed without separate signaling. Alternatively, the switching operation (or activation operation or deactivation operation) of the SL BWP may be performed by separate signaling. According to the above-described operations, sidelink communication may be efficiently performed in the SL BWP.

DETAILED DESCRIPTION OF THE EMBODIMENTS

Figure 1:
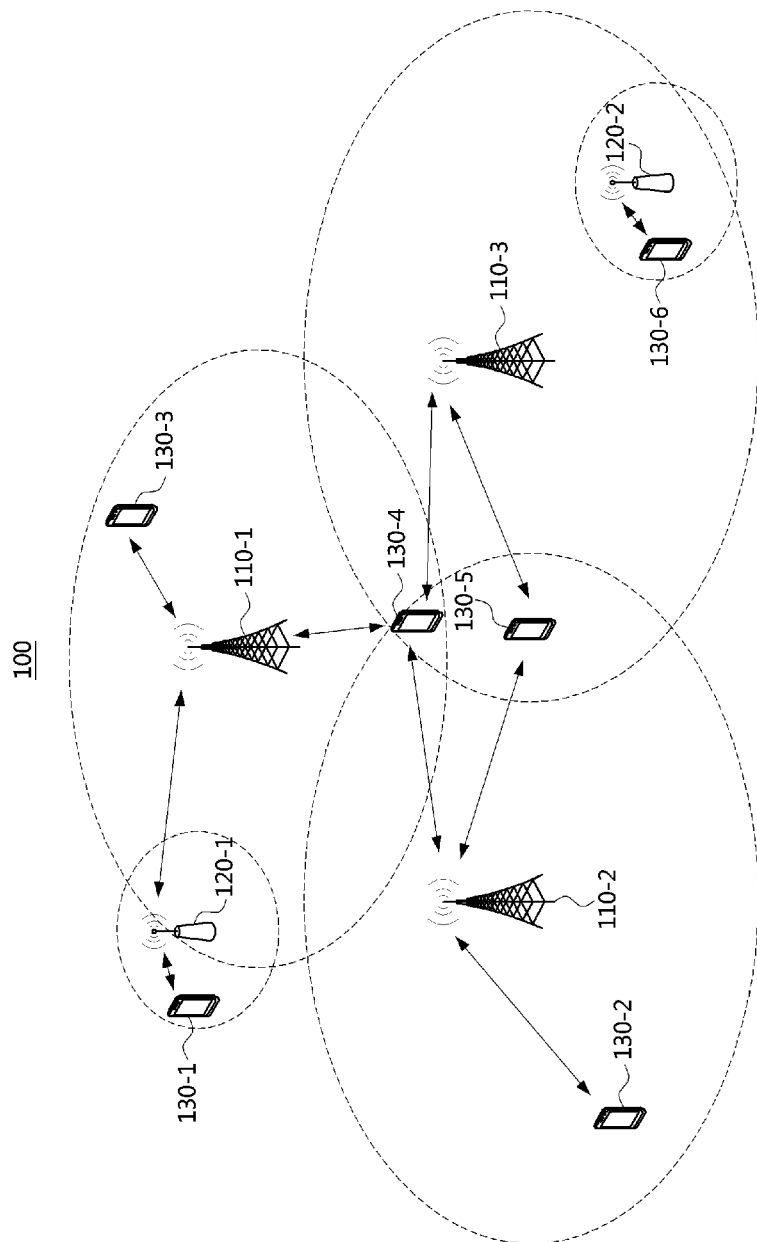
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

FIG. 1 is a conceptual diagram illustrating a first exemplary embodiment of a communication system.

As shown in FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g., a serving gateway (S-GW), a packet data network (PDN) gateway (P-GW), and a mobility management entity (MME)). When the communication system 100 is a 5G communication system (e.g., new radio (NR) system), the core network may include an access and mobility management function (AMF), a user plane function (UPF), a session management function (SMF), and the like.

The plurality of communication nodes 110 to 130 may support a communication protocol defined by the 3rd generation partnership project (3GPP) specifications (e.g., LTE communication protocol, LTE-A communication protocol, NR communication protocol, or the like). The plurality of communication nodes 110 to 130 may support code division multiple access (CDMA) technology, wideband CDMA (WCDMA) technology, time division multiple access (TDMA) technology, frequency division multiple access (FDMA) technology, orthogonal frequency division multiplexing (OFDM) technology, filtered OFDM technology, cyclic prefix OFDM (CP-OFDM) technology, discrete Fourier transform-spread-OFDM (DFT-s-OFDM) technology, orthogonal frequency division multiple access (OFDMA) technology, single carrier FDMA (SC-FDMA) technology, non-orthogonal multiple access (NOMA) technology, generalized frequency division multiplexing (GFDM) technology, filter band multi-carrier (FBMC) technology, universal filtered multi-carrier (UFMC) technology, space division multiple access (SDMA) technology, or the like. Each of the plurality of communication nodes may have the following structure.

Figure 2:
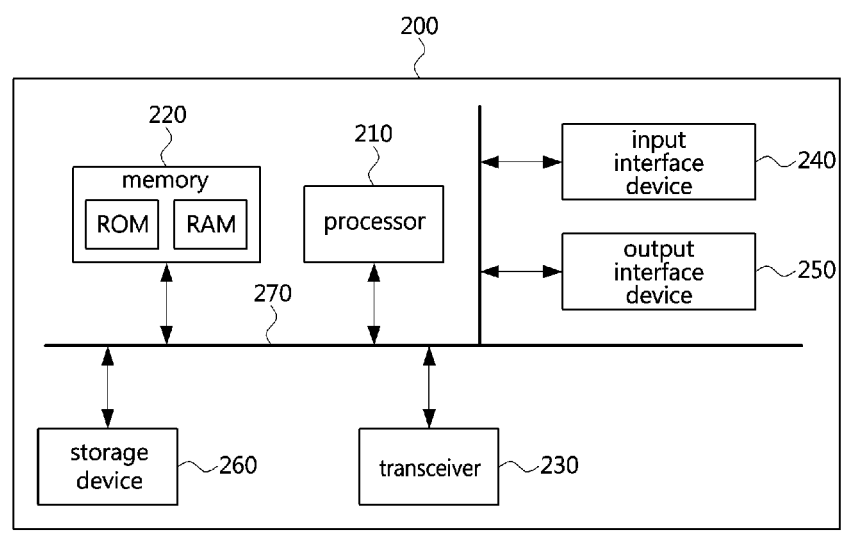
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B (NB), a evolved Node-B (eNB), a gNB, an advanced base station (ABS), a high reliability-base station (HR-BS), a base transceiver station (BTS), a radio base station, a radio transceiver, an access point, an access node, a radio access station (RAS), a mobile multihop relay-base station (MMR-BS), a relay station (RS), an advanced relay station (ARS), a high reliability-relay station (HR-RS), a home NodeB (HNB), a home eNodeB (HeNB), a road side unit (RSU), a radio remote head (RRH), a transmission point (TP), a transmission and reception point (TRP), or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, device-to-device (D2D) communication (or, proximity services (ProSe)), Internet of Things (IoT) communications, dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, the communication system may support three types of frame structures. A type 1 frame structure may be applied to a frequency division duplex (FDD) communication system, a type 2 frame structure may be applied to a time division duplex (TDD) communication system, and a type 3 frame structure may be applied to an unlicensed band based communication system (e.g., a licensed assisted access (LAA) communication system).

Figure 3:
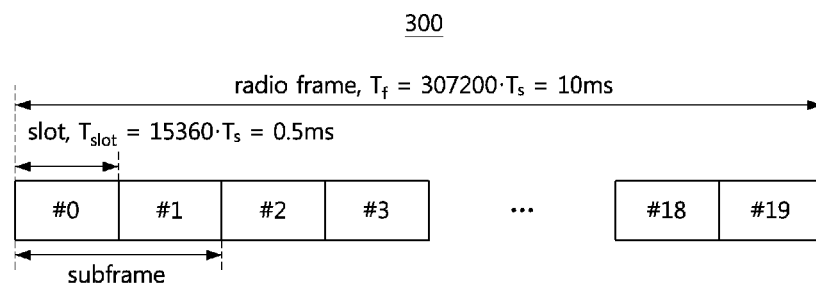
FIG. 3 is a conceptual diagram illustrating a first exemplary embodiment of a type 1 frame.

FIG. 3 is a conceptual diagram illustrating a first exemplary embodiment of a type 1 frame.

Referring to FIG. 3, a radio frame 300 may comprise 10 subframes, and a subframe may comprise 2 slots. Thus, the radio frame 300 may comprise 20 slots (e.g., slot #0, slot #1, slot #2, slot #3, ..., slot #18, and slot #19). The length $T_f$ of the radio frame 300 may be 10 milliseconds (ms). The length of the subframe may be 1 ms, and the length $T_{slot}$ of a slot may be 0.5 ms. Here, $T_s$ may indicate a sampling time, and may be 1/30,720,000 s.

The slot may be composed of a plurality of OFDM symbols in the time domain, and may be composed of a plurality of resource blocks (RBs) in the frequency domain. The RB may be composed of a plurality of subcarriers in the frequency domain. The number of OFDM symbols constituting the slot may vary depending on configuration of a cyclic prefix (CP). The CP may be classified into a normal CP and an extended CP. If the normal CP is used, the slot may be composed of 7 OFDM symbols, in which case the subframe may be composed of 14 OFDM symbols. If the extended CP is used, the slot may be composed of 6 OFDM symbols, in which case the subframe may be composed of 12 OFDM symbols.

Figure 4:
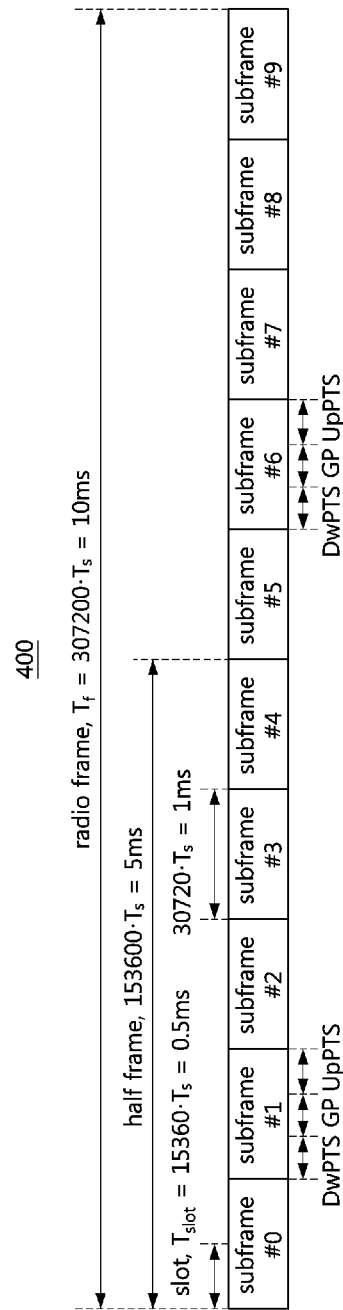
FIG. 4 is a conceptual diagram illustrating a first exemplary embodiment of a type 2 frame.

FIG. 4 is a conceptual diagram illustrating a first exemplary embodiment of a type 2 frame.

Referring to FIG. 4, a radio frame 400 may comprise two half frames, and a half frame may comprise 5 subframes. Thus, the radio frame 400 may comprise 10 subframes. The length $T_f$ of the radio frame 400 may be 10 ms. The length of the half frame may be 5 ms. The length of the subframe may be 1 ms. Here, $T_s$ may be 1/30,720,000 s.

The radio frame 400 may include at least one downlink subframe, at least one uplink subframe, and a least one special subframe. Each of the downlink subframe and the uplink subframe may include two slots. The length $T_{slot}$ of a slot may be 0.5 ms. Among the subframes included in the radio frame 400, each of the subframe #1 and the subframe #6 may be a special subframe. For example, when a switching periodicity between downlink and uplink is 5 ms, the radio frame 400 may include 2 special subframes. Alternatively, the switching periodicity between downlink and uplink is 10 ms, the radio frame 400 may include one special subframe. The special subframe may include a downlink pilot time slot (DwPTS), a guard period (GP), and an uplink pilot time slot (UpPTS).

The downlink pilot time slot may be regarded as a downlink interval and may be used for cell search, time and frequency synchronization acquisition of the terminal, channel estimation, and the like. The guard period may be used for resolving interference problems of uplink data transmission caused by delay of downlink data reception. Also, the guard period may include a time required for switching from the downlink data reception operation to the uplink data transmission operation. The uplink pilot time slot may be used for uplink channel estimation, time and frequency synchronization acquisition, and the like. Transmission of a physical random access channel (PRACH) or a sounding reference signal (SRS) may be performed in the uplink pilot time slot.

The lengths of the downlink pilot time slot, the guard period, and the uplink pilot time slot included in the special subframe may be variably adjusted as needed. In addition, the number and position of each of the downlink subframe, the uplink subframe, and the special subframe included in the radio frame 400 may be changed as needed.

In the communication system, a transmission time interval (TTI) may be a basic time unit for transmitting coded data through a physical layer. A short TTI may be used to support low latency requirements in the communication system. The length of the short TTI may be less than 1 ms. The conventional TTI having a length of 1 ms may be referred to as a base TTI or a regular TTI. That is, the base TTI may be composed of one subframe. In order to support transmission on a base TTI basis, signals and channels may be configured on a subframe basis. For example, a cell-specific reference signal (CRS), a physical downlink control channel (PDCCH), a physical downlink shared channel (PDSCH), a physical uplink control channel (PUCCH), a physical uplink shared channel (PUSCH), and the like may exist in each subframe.

On the other hand, a synchronization signal (e.g., a primary synchronization signal (PSS) and a secondary synchronization signal (SSS)) may exist for every 5 subframes, and a physical broadcast channel (PBCH) may exist for every 10 subframes. Also, each radio frame may be identified by an SFN, and the SFN may be used for defining transmission of a signal (e.g., a paging signal, a reference signal for channel estimation, a signal for channel state information, etc.) longer than one radio frame. The periodicity of the SFN may be 1024.

In the LTE system, the PBCH may be a physical layer channel used for transmission of system information (e.g., master information block (MIB)). The PBCH may be transmitted every 10 subframes. That is, the transmission periodicity of the PBCH may be 10 ms, and the PBCH may be transmitted once in the radio frame. The same MIB may be transmitted during 4 consecutive radio frames, and after 4 consecutive radio frames, the MIB may be changed according to a situation of the LTE system. The transmission period for which the same MIB is transmitted may be referred to as a 'PBCH TTI', and the PBCH TTI may be 40 ms. That is, the MIB may be changed for each PBCH TTI.

The MIB may be composed of 40 bits. Among the 40 bits constituting the MIB, 3 bits may be used to indicate a system band, 3 bits may be used to indicate physical hybrid automatic repeat request (ARQ) indicator channel (PHICH) related information, 8 bits may be used to indicate an SFN, 10 bits may be configured as reserved bits, and 16 bits may be used for a cyclic redundancy check (CRC).

The SFN for identifying the radio frame may be composed of a total of 10 bits (B9 to B0), and the most significant bits (MSBs) 8 bits (B9 to B2) among the 10 bits may be indicated by the PBCH (i.e., MIB). The MSBs 8 bits (B9 to B2) of the SFN indicated by the PBCH (i.e., MIB) may be identical during 4 consecutive radio frames (i.e., PBCH TTI). The least significant bits (LSBs) 2 bits (B1 to B0) of the SFN may be changed during 4 consecutive radio frames (i.e., PBCH TTI), and may not be explicitly indicated by the PBCH (i.e., MIB). The LSBs (2 bits (B1 to B0)) of the SFN may be implicitly indicated by a scrambling sequence of the PBCH (hereinafter referred to as 'PBCH scrambling sequence').

A Gold sequence generated by being initialized by a cell ID may be used as the PBCH scrambling sequence, and the PBCH scrambling sequence may be initialized for each four consecutive radio frames (e.g., each PBCH TTI) based on an operation of 'mod (SFN, 4)'. The PBCH transmitted in a radio frame corresponding to an SFN with LSBs 2 bits (B1 to B0) set to '00' may be scrambled by the Gold sequence generated by being initialized by the cell ID. Thereafter, the Gold sequences generated according to the operation of 'mod (SFN, 4)' may be used to scramble the PBCH transmitted in the radio frames corresponding to SFNs with LSBs 2 bits (B1 to B0) set to '01', '10', and '11'.

Accordingly, the terminal having acquired the cell ID in the initial cell search process may identify the value of the LSBs 2 bits (B1 to B0) of the SFN (e.g., '00', '01', '10', or '11') based on the PBCH scramble sequence obtained in the decoding process for the PBCH (i.e., MIB). The terminal may use the LSBs 2 bits (B1 to B0) of the SFN obtained based on the PBCH scrambling sequence and the MSBs 8 bits (B9 to B2) of the SFN indicated by the PBCH (i.e., MIB) so as to identify the SFN (i.e., the entire bits B9 to B0 of the SFN).

On the other hand, the communication system may support not only a high transmission rate but also technical requirements for various service scenarios. For example, the communication system may support an enhanced mobile broadband (eMBB) service, an ultra-reliable low-latency communication (URLLC) service, a massive machine type communication (mMTC) service, and the like.

The subcarrier spacing of the communication system (e.g., OFDM-based communication system) may be determined based on a carrier frequency offset (CFO) and the like. The CFO may be generated by a Doppler effect, a phase drift, or the like, and may increase in proportion to an operation frequency. Therefore, in order to prevent the performance degradation of the communication system due to the CFO, the subcarrier spacing may increase in proportion to the operation frequency. On the other hand, as the subcarrier spacing increases, a CP overhead may increase. Therefore, the subcarrier spacing may be configured based on a channel characteristic, a radio frequency (RF) characteristic, etc. according to a frequency band.

The communication system may support numerologies defined in Table 1 below.

TABLE 1

| | Numerology ($\mu$) | | | | | |
|---|---|---|---|---|---|---|
| | 0 | 1 | 2 | 3 | 4 | 5 |
| Subcarrier spacing | 15 kHz | 30 kHz | 60 kHz | 120 kHz | 240 kHz | 480 kHz |
| OFDM symbol length [us] | 66.7 | 33.3 | 16.7 | 8.3 | 4.2 | 2.1 |
| CP length [us] | 4.76 | 2.38 | 1.19 | 0.60 | 0.30 | 0.15 |
| Number of OFDM symbols within 1 ms | 14 | 28 | 56 | 112 | 224 | 448 |

For example, the subcarrier spacing of the communication system may be set to 15 kHz, 30 kHz, 60 kHz, or 120 kHz. The subcarrier spacing of the LTE system may be 15 kHz, and the subcarrier spacing of the NR system may be 1, 2, 4, or 8 times the conventional subcarrier spacing of 15 kHz. If the subcarrier spacing increases by exponentiation units of 2 of the conventional subcarrier spacing, the frame structure can be easily designed.

The communication system may support a wide frequency band (e.g., several hundred MHz to tens of GHz). Since the diffraction characteristic and the reflection characteristic of the radio wave are poor in a high frequency band, a propagation loss (e.g., path loss, reflection loss, and the like) in a high frequency band may be larger than a propagation loss in a low frequency band. Therefore, a cell coverage of a communication system supporting a high frequency band may be smaller than a cell coverage of a communication system supporting a low frequency band. In order to solve such the problem, a beamforming scheme based on a plurality of antenna elements may be used to increase the cell coverage in the communication system supporting a high frequency band.

The beamforming scheme may include a digital beamforming scheme, an analog beamforming scheme, a hybrid beamforming scheme, and the like. In the communication system using the digital beamforming scheme, a beamforming gain may be obtained using a plurality of RF paths based on a digital precoder or a codebook. In the communication system using the analog beamforming scheme, a beamforming gain may be obtained using analog RF devices (e.g., phase shifter, power amplifier (PA), variable gain amplifier (VGA), and the like) and an antenna array.

Because of the need for expensive digital to analog converters (DACs) or analog to digital converters (ADCs) for digital beamforming schemes and transceiver units corresponding to the number of antenna elements, the complexity of antenna implementation may be increased to increase the beamforming gain. In case of the communication system using the analog beamforming scheme, since a plurality of antenna elements are connected to one transceiver unit through phase shifters, the complexity of the antenna implementation may not increase greatly even if the beamforming gain is increased. However, the beamforming performance of the communication system using the analog beamforming scheme may be lower than the beamforming performance of the communication system using the digital beamforming scheme. Further, in the communication system using the analog beamforming scheme, since the phase shifter is adjusted in the time domain, frequency resources may not be efficiently used. Therefore, a hybrid beam forming scheme, which is a combination of the digital scheme and the analog scheme, may be used.

When the cell coverage is increased by the use of the beamforming scheme, common control channels and common signals (e.g., reference signal and synchronization signal) for all terminals belonging to the cell coverage as well as control channels and data channels for each terminal may also be transmitted based on the beamforming scheme. In this case, the common control channels and the common signals for all terminals belonging to the cell coverage may be transmitted based on a beam sweeping scheme.

Also, in the NR system, a synchronization signal/physical broadcast channel (SS/PBCH) block may also be transmitted in a beam sweeping scheme. The SS/PBCH block may be composed of a PSS, an SSS, a PBCH, and the like. In the SS/PBCH block, the PSS, the SSS, and the PBCH may be configured in a time division multiplexing (TDM) manner. The SS/PBCH block may be referred also to as an 'SS block (SSB)'. One SS/PBCH block may be transmitted using N consecutive OFDM symbols. Here, N may be an integer equal to or greater than 4. The base station may periodically transmit the SS/PBCH block, and the terminal may acquire frequency/time synchronization, a cell ID, system information, and the like based on the SS/PBCH block received from the base station. The SS/PBCH block may be transmitted as follows.

Figure 5:
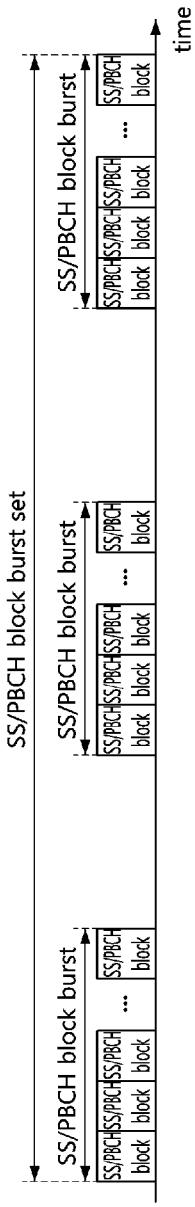
FIG. 5 is a conceptual diagram illustrating a first exemplary embodiment of a transmission method of SS/PBCH block in a communication system.

FIG. 5 is a conceptual diagram illustrating a first exemplary embodiment of a transmission method of SS/PBCH block in a communication system.

As shown in FIG. 5, one or more SS/PBCH blocks may be transmitted in a beam sweeping scheme within an SS/PBCH block burst set. Up to L SS/PBCH blocks may be transmitted within one SS/PBCH block burst set. L may be an integer equal to or greater than 2, and may be defined in the 3GPP standard. Depending on a region of a system frequency, L may vary. Within the SS/PBCH block burst set, the SS/PBCH blocks may be located consecutively or distributedly. The consecutive SS/PBCH blocks may be referred to as an 'SS/PBCH block burst'. The SS/PBCH block burst set may be repeated periodically, and system information (e.g., MIB) transmitted through the PBCHs of the SS/PBCH blocks within the SS/PBCH block burst set may be the same. An index of the SS/PBCH block, an index of the SS/PBCH block burst, an index of an OFDM symbol, an index of a slot, and the like may be indicated explicitly or implicitly by the PBCH.

Figure 6:
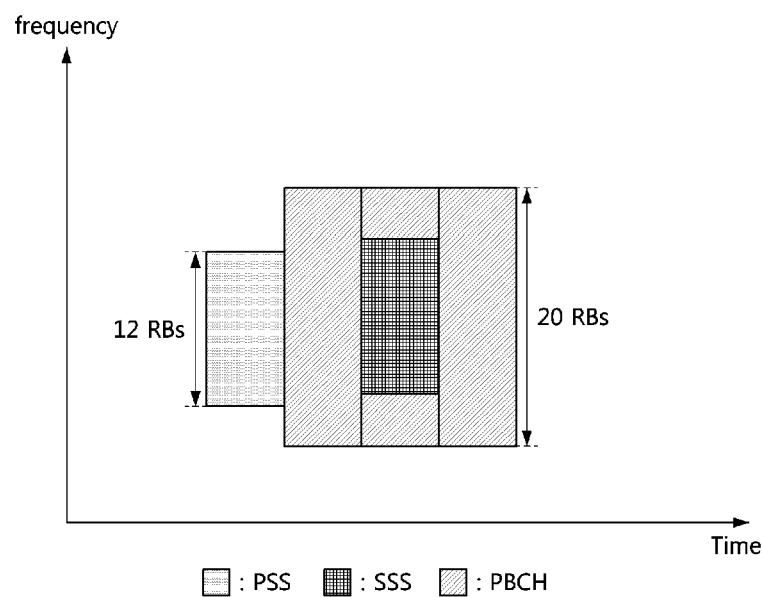
FIG. 6 is a conceptual diagram illustrating a first exemplary embodiment of an SS/PBCH block in a communication system.

FIG. 6 is a conceptual diagram illustrating a first exemplary embodiment of an SS/PBCH block in a communication system.

As shown in FIG. 6, signals and a channel are arranged within one SS/PBCH block in the order of 'PSS→PBCH→SSS→PBCH'. The PSS, SSS, and PBCH within the SS/PBCH block may be configured in a TDM scheme. In a symbol where the SSS is located, the PBCH may be located in frequency resources above the SSS and frequency resources below the SSS. That is, the PBCH may be transmitted in both end bands adjacent to the frequency band in which the SSS is transmitted. When the maximum number L of SS/PBCH blocks is 8 in the sub 6 GHz frequency band, an SS/PBCH block index may be identified based on a demodulation reference signal used for demodulating the PBCH (hereinafter, referred to as 'PBCH DMRS'). When the maximum number L of SSBs is 64 in the over 6 GHz frequency band, LSB 3 bits of 6 bits representing the SS/PBCH block index may be identified based on the PBCH DMRS, and the remaining MSB 3 bits may be identified based on a payload of the PBCH.

The maximum system bandwidth that can be supported in the NR system may be 400 MHz. The size of the maximum bandwidth that can be supported by the terminal may vary depending on the capability of the terminal. Therefore, the terminal may perform an initial access procedure (e.g., initial connection procedure) by using some of the system bandwidth of the NR system supporting a wide band. In order to support access procedures of terminals supporting various sizes of bandwidths, SS/PBCH blocks may be multiplexed in the frequency domain within the system bandwidth of the NR system supporting a wide band. In this case, the SS/PBCH blocks may be transmitted as follows.

Figure 7:
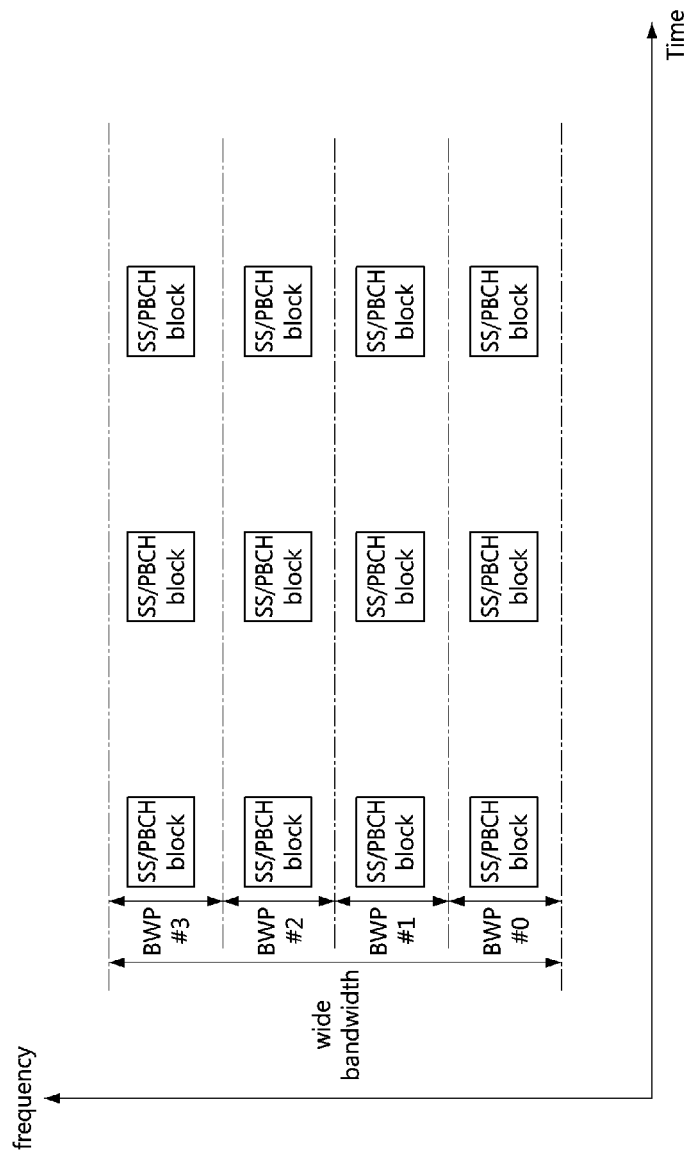
FIG. 7 is a conceptual diagram illustrating a second exemplary embodiment of a method of transmitting SS/PBCH blocks in a communication system.

FIG. 7 is a conceptual diagram illustrating a second exemplary embodiment of a method of transmitting SS/PBCH blocks in a communication system.

As shown in FIG. 7, a wideband component carrier (CC) may include a plurality of bandwidth parts (BWPs). For example, the wideband CC may include 4 BWPs. The base station may transmit SS/PBCH blocks in the respective BWPs #0 to #3 belonging to the wideband CC. The terminal may receive the SS/PBCH block(s) from one or more BWPs of the BWPs #0 to #3, and may perform an initial access procedure using the received SS/PBCH block.

After detecting the SS/PBCH block, the terminal may acquire system information (e.g., remaining minimum system information (RMSI)), and may perform a cell access procedure based on the system information. The RMSI may be transmitted on a PDSCH scheduled by a PDCCH. Configuration information of a control resource set (CORESET) in which the PDCCH including scheduling information of the PDSCH through which the RMSI is transmitted may be transmitted on a PBCH within the SS/PBCH block. A plurality of SS/PBCH blocks may be transmitted in the entire system band, and one or more SS/PBCH blocks among the plurality of SS/PBCH blocks may be SS/PBCH block(s) associated with the RMSI. The remaining SS/PBCH blocks may not be associated with the RMSI. The SS/PBCH block associated with the RMSI may be defined as a 'cell defining SS/PBCH block'. The terminal may perform a cell search procedure and an initial access procedure by using the cell-defining SS/PBCH block. The SS/PBCH block not associated with the RMSI may be used for a synchronization procedure and/or a measurement procedure in the corresponding BWP. The BWP(s) through which the SS/PBCH block is transmitted may be limited to one or more BWPs within a wide bandwidth.

The RMSI may be obtained by performing an operation to obtain configuration information of a CORESET from the SS/PBCH block (e.g., PBCH), an operation of detecting a PDCCH based on the configuration information of the CORESET, an operation to obtain scheduling information of a PDSCH from the PDCCH, and an operation to receive the RMSI through the PDSCH. A transmission resource of the PDCCH may be configured by the configuration information of the CORESET. A mapping patter of the RMSI CORESET pattern may be defined as follows. The RMSI CORESET may be a CORESET used for transmission and reception of the RMSI.

Figure 8A:
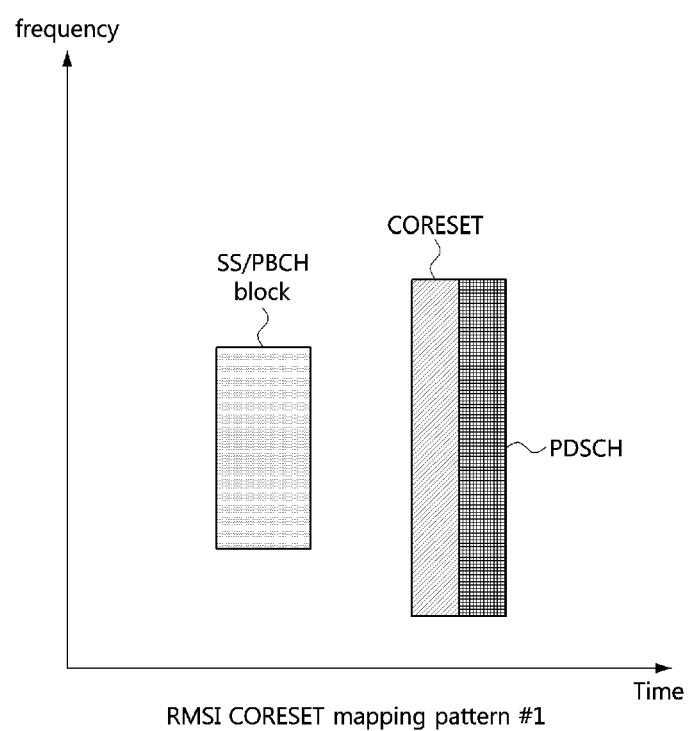
FIG. 8A is a conceptual diagram illustrating an RMSI CORESET mapping pattern #1 in a communication system.
Figure 8B:
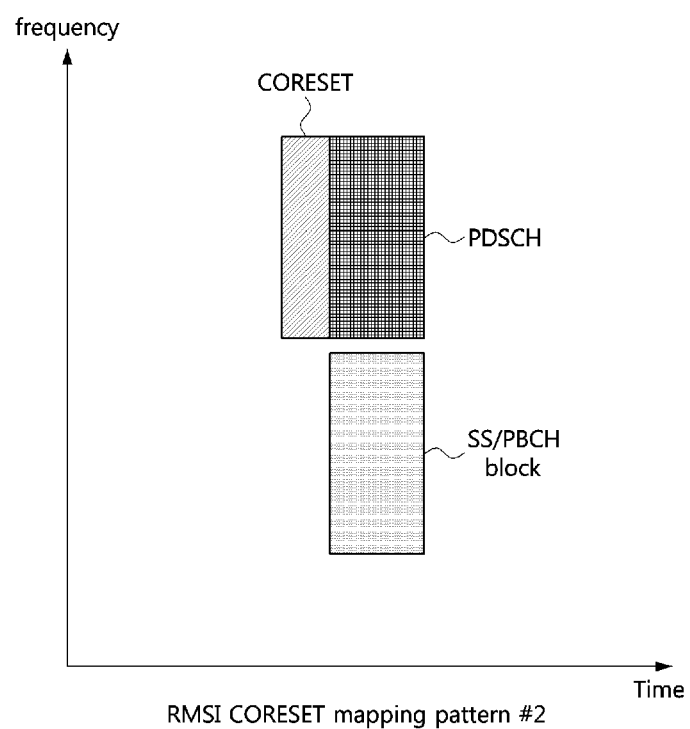
FIG. 8B is a conceptual diagram illustrating an RMSI CORESET mapping pattern #2 in a communication system.
Figure 8C:
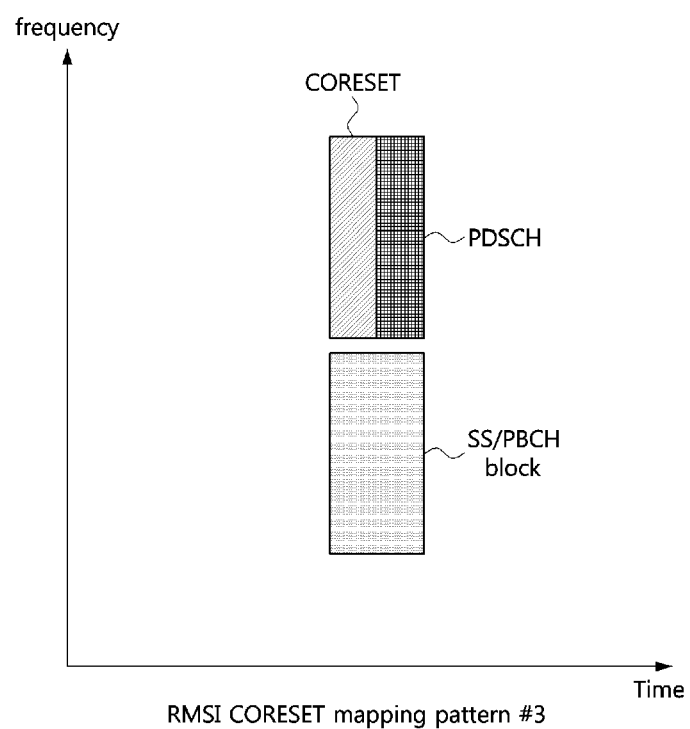
FIG. 8C is a conceptual diagram illustrating an RMSI CORESET mapping pattern #3 in a communication system.

FIG. 8A is a conceptual diagram illustrating an RMSI CORESET mapping pattern #1 in a communication system, FIG. 8B is a conceptual diagram illustrating an RMSI CORESET mapping pattern #2 in a communication system, and FIG. 8C is a conceptual diagram illustrating an RMSI CORESET mapping pattern #3 in a communication system.

As shown in FIGS. 8A to 8C, one RMSI CORESET mapping pattern among the RMSI CORESET mapping patterns #1 to #3 may be used, and a detailed configuration according to the one RMSI CORESET mapping pattern may be determined. In the RMSI CORESET mapping pattern #1, the SS/PBCH block, the CORESET (i.e., RMSI CORE-SET), and the PDSCH (i.e., RMSI PDSCH) may be configured in a TDM scheme. The RMSI PDSCH may mean the PDSCH through which the RMSI is transmitted. In the RMSI CORESET mapping pattern #2, the CORESET (i.e., RMSI CORESET) and the PDSCH (i.e., RMSI PDSCH) may be configured in a TDM scheme, and the PDSCH (i.e., RMSI PDSCH) and the SS/PBCH block may be configured in a frequency division multiplexing (FDM) scheme. In the RMSI CORESET mapping pattern #3, the CORESET (i.e., RMSI CORESET) and the PDSCH (i.e., RMSI PDSCH) may be configured in a TDM scheme, and the CORESET (i.e., RMSI CORESET) and the PDSCH (i.e., RMSI PDSCH) may be multiplexed with the SS/PBCH block in a FDM scheme.

In the frequency band of 6 GHz or below, only the RMSI CORESET mapping pattern #1 may be used. In the frequency band of 6 GHz or above, all of the RMSI CORESET mapping patterns #1, #2, and #3 may be used. The numerology of the SS/PBCH block may be different from that of the RMSI CORESET and the RMSI PDSCH. Here, the numerology may be a subcarrier spacing. In the RMSI CORESET mapping pattern #1, a combination of all numerologies may be used. In the RMSI CORESET mapping pattern #2, a combination of numerologies (120 kHz, 60 kHz) or (240 kHz, 120 kHz) may be used for the SS/PBCH block and the RMSI CORESET/PDSCH. In the RMSI CORESET mapping pattern #3, a combination of numerologies (120 kHz, 120 kHz) may be used for the SS/PBCH block and the RMSI CORESET/PDSCH.

One RMSI CORESET mapping pattern may be selected from the RMSI CORESET mapping patterns #1 to #3 according to the combination of the numerology of the SS/PBCH block and the numerology of the RMSI CORE-SET/PDSCH. The configuration information of the RMSI CORESET may include Table A and Table B. Table A may represent the number of resource blocks (RBs) of the RMSI CORESET, the number of symbols of the RMSI CORESET, and an offset between an RB (e.g., starting RB or ending RB) of the SS/PBCH block and an RB (e.g., starting RB or ending RB) of the RMSI CORESET. Table B may represent the number of search space sets per slot, an offset of the RMSI CORESET, and an OFDM symbol index in each of the RMSI CORESET mapping patterns. Table B may represent information for configuring a monitoring occasion of the RMSI PDCCH. Each of Table A and Table B may be composed of a plurality of sub-tables. For example, Table A may include sub-tables 13-1 to 13-8 defined in the technical specification (TS) 38.213, and Table B may include sub-tables 13-9 to 13-13 defined in the TS 38.213. The size of each of Table A and Table B may be 4 bits.

In the NR system, a PDSCH may be mapped to the time domain according to a PDSCH mapping type A or a PDSCH mapping type B. The PDSCH mapping types A and B may be defined as Table 2 below.

TABLE 2

| PDSCH mapping type | Normal CP | | | Extended CP | | |
|---|---|---|---|---|---|---|
| | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

Note 1:
S = 3 is applicable only if dmrs-TypeA-Position = 3

The type A (i.e., PDSCH mapping type A) may be slot-based transmission. When the type A is used, a position of a start symbol of a PDSCH may be set to one of 10, 1, 2, 31. When the type A and a normal CP are used, the number of symbols constituting the PDSCH (e.g., the duration of the PDSCH) may be set to one of 3 to 14 within a range not exceeding a slot boundary. The type B (i.e., PDSCH mapping type B) may be non-slot-based transmission. When the type B is used, a position of a start symbol of a PDSCH may be set to one of 0 to 12. When the type B and the normal CP are used, the number of symbols constituting the PDSCH (e.g., the duration of the PDSCH) may be set to one of {2, 4, 7} within a range not exceeding a slot boundary. A DMRS (hereinafter, referred to as 'PDSCH DMRS') for demodulation of the PDSCH (e.g., data) may be determined by a value of ID indicating the PDSCH mapping type (e.g., type A or type B) and the length. The ID may be defined differently according to the PDSCH mapping type.

Meanwhile, NR-unlicensed (NR-U) is being discussed in the NR standardization meeting. The NR-U system may increase network capacity by improving the utilization of limited frequency resources. The NR-U system may support operation in an unlicensed band (e.g., unlicensed spectrum).

In the NR-U system, the terminal may determine whether a signal is transmitted from a base station based on a discovery reference signal (DRS) received from the corresponding base station in the same manner as in the general NR system. In the NR-U system in a Stand-Alone (SA) mode, the terminal may acquire synchronization and/or system information based on the DRS. In the NR-U system, the DRS may be transmitted according to a regulation of the unlicensed band (e.g., transmission band, transmission power, transmission time, etc.). For example, according to Occupied Channel Bandwidth (OCB) regulations, signals may be configured and/or transmitted to occupy 80% of the total channel bandwidth (e.g., 20 MHz).

In the NR-U system, a communication node (e.g., base station, terminal) may perform a Listen Before Talk (LBT) procedure before transmitting a signal and/or a channel for coexistence with another system. The signal may be a synchronization signal, a reference signal (e.g., DRS, DMRS, channel state information (CSI)-RS, phase tracking (PT)-RS, sounding reference signal (SRS)), or the like. The channel may be a downlink channel, an uplink channel, a sidelink channel, or the like. In exemplary embodiments, a signal may mean the 'signal', the 'channel', or the 'signal and channel'. The LBT procedure may be an operation for checking whether a signal is transmitted by another communication node. If it is determined by the LBT procedure that there is no transmission signal (e.g., when the LBT procedure is successful), the communication node may transmit a signal in the unlicensed band. If it is determined by the LBT procedure that a transmission signal exists (e.g., when the LBT fails), the communication node may not be able to transmit a signal in the unlicensed band. The communication node may perform a LBT procedure according to one of various categories before transmission of a signal. The category of LBT may vary depending on the type of the transmission signal.

Meanwhile, NR vehicle-to-everything (V2X) communication technology is being discussed in the NR standardization meeting. The NR V2X communication technology may be a technology that supports communication between vehicles, communication between a vehicle and an infrastructure, communication between a vehicle and a pedestrian, and the like based on device-to-device (D2D) communication technologies.

The NR V2X communication (e.g., sidelink communication) may be performed according to three transmission schemes (e.g., unicast scheme, broadcast scheme, groupcast scheme). When the unicast scheme is used, the first terminal may transmit data (e.g., sidelink data) to the second terminal. When the broadcast scheme is used, the first terminal may transmit data to all terminals. When the groupcast scheme is used, the first terminal may transmit data to a group (e.g., groupcast group) composed of a plurality of terminals.

When the unicast scheme is used, the second terminal may transmit feedback information (e.g., acknowledgment (ACK) or negative ACK (NACK)) to the first terminal in response to data received from the first terminal. In the exemplary embodiments below, the feedback information may be referred to as a 'feedback signal', a 'physical sidelink feedback channel (PSFCH) signal', or the like. When ACK is received from the second terminal, the first terminal may determine that the data has been successfully received at the second terminal. When NACK is received from the second terminal, the first terminal may determine that the second terminal has failed to receive the data. In this case, the first terminal may transmit additional information to the second terminal based on an HARQ scheme. Alternatively, the first terminal may improve a reception probability of the data at the second terminal by retransmitting the same data to the second terminal.

When the broadcast scheme is used, a procedure for transmitting feedback information for data may not be performed. For example, system information may be transmitted in the broadcast scheme, and the terminal may not transmit feedback information for the system information to the base station. Therefore, the base station may not identify whether the system information has been successfully received at the terminal. To solve this problem, the base station may periodically broadcast the system information.

When the groupcast scheme is used, a procedure for transmitting feedback information for data may not be performed. For example, necessary information may be periodically transmitted in the groupcast scheme, without the procedure for transmitting feedback information. However, when the candidates of terminals participating in the groupcast scheme-based communication and/or the number of the terminals participating in that is limited, and the data transmitted in the groupcast scheme is data that should be received within a preconfigured time (e.g., data sensitive to delay), it may be necessary to transmit feedback information also in the groupcast sidelink communication. The groupcast sidelink communication may mean sidelink communication performed in the groupcast scheme. When the feedback information transmission procedure is performed in the groupcast sidelink communication, data can be transmitted and received efficiently and reliably.

In addition, data reliability at the receiving terminal may be improved by appropriately adjusting a transmit power of the transmitting terminal according to a transmission environment. Interference to other terminals may be mitigated by appropriately adjusting the transmit power of the transmitting terminal. Energy efficiency can be improved by reducing unnecessary transmit power. A power control scheme may be classified into an open-loop power control scheme and a closed-loop power control scheme. In the open-loop power control scheme, the transmitting terminal may determine the transmit power in consideration of configuration, a measured environment, etc. In the closed-loop power control scheme, the transmitting terminal may determine the transmit power based on a transmit power control (TPC) command received from the receiving terminal.

It may be difficult due to various causes including a multipath fading channel, interference, and the like to predict a received signal strength at the receiving terminal. Accordingly, the receiving terminal may adjust a receive power level (e.g., receive power range) by performing an automatic gain control (AGC) operation to prevent a quantization error of the received signal and maintain a proper receive power. In the communication system, the terminal may perform the AGC operation using a reference signal received from the base station. However, in the sidelink communication (e.g., V2X communication), the reference signal may not be transmitted from the base station. That is, in the sidelink communication, communication between terminals may be performed without the base station. Therefore, it may be difficult to perform the AGC operation in the sidelink communication. In the sidelink communication, the transmitting terminal may first transmit a signal (e.g., reference signal) to the receiving terminal before transmitting data, and the receiving terminal may adjust a receive power range (e.g., receive power level) by performing an AGC operation based on the signal received from the transmitting terminal. Thereafter, the transmitting terminal may transmit sidelink data to the receiving terminal. The signal used for the AGC operation may be a signal duplicated from a signal to be transmitted later or a signal preconfigured between the terminals.

A time period required for the ACG operation may be 15 μs. When a subcarrier spacing of 15 kHz is used in the NR system, a time period (e.g., length) of one symbol (e.g., OFDM symbol) may be 66.7 When a subcarrier spacing of 30 kHz is used in the NR system, a time period of one symbol (e.g., OFDM symbol) may be 33.3 In the following exemplary embodiments, a symbol may mean an OFDM symbol. That is, a time period of one symbol may be twice or more than a time period required for the ACG operation.

For sidelink communication, it may be necessary to transmit a data channel for data transmission and a control channel including scheduling information for data resource allocation. In sidelink communication, the data channel may be a physical sidelink shared channel (PSSCH), and the control channel may be a physical sidelink control channel (PSCCH). The data channel and the control channel may be multiplexed in a resource domain (e.g., time and frequency resource domains).

Figure 9:
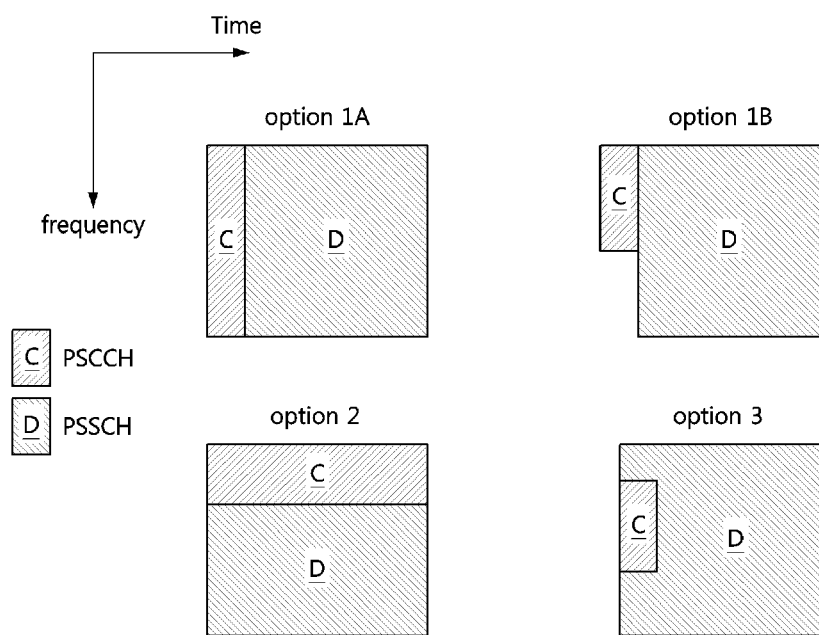
FIG. 9 is a conceptual diagram illustrating exemplary embodiments of a method for multiplexing a control channel and a data channel in sidelink communication.

FIG. 9 is a conceptual diagram illustrating exemplary embodiments of a method for multiplexing a control channel and a data channel in sidelink communication.

Referring to FIG. 9, sidelink communication may support an option 1A, an option 1B, an option 2, and an option 3. When the option 1A and/or the option 1B is supported, a control channel and a data channel may be multiplexed in the time domain. When the option 2 is supported, a control channel and a data channel may be multiplexed in the frequency domain. When the option 3 is supported, a control channel and a data channel may be multiplexed in the time and frequency domains. The sidelink communication may basically support the option 3.

In the sidelink communication (e.g., NR-V2X sidelink communication), a basic unit of resource configuration may be a subchannel. The subchannel may be defined with time and frequency resources. For example, the subchannel may be composed of a plurality of symbols (e.g., OFDM symbols) in the time domain, and may be composed of a plurality of resource blocks (RBs) in the frequency domain. The subchannel may be referred to as an RB set. In the subchannel, a data channel and a control channel may be multiplexed based on the option 3.

In the sidelink communication (e.g., NR-V2X sidelink communication), transmission resources may be allocated based on a mode 1 or a mode 2. When the mode 1 is used, a base station may allocate sidelink resource(s) for data transmission within a resource pool to a transmitting terminal, and the transmitting terminal may transmit data to a receiving terminal using the sidelink resource(s) allocated by the base station. Here, the transmitting terminal may be a terminal that transmits data in sidelink communication, and the receiving terminal may be a terminal that receives the data in sidelink communication.

When the mode 2 is used, a transmitting terminal may autonomously select sidelink resource(s) to be used for data transmission by performing a resource sensing operation and/or a resource selection operation within a resource pool. The base station may configure the resource pool for the mode 1 and the resource pool for the mode 2 to the terminal(s). The resource pool for the mode 1 may be configured independently from the resource pool for the mode 2. Alternatively, a common resource pool may be configured for the mode 1 and the mode 2.

Hereinafter, sidelink communication methods based on one or more bandwidth parts (BWPs) in a communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a transmitting terminal is described, a corresponding receiving terminal may perform an operation corresponding to the operation of the transmitting terminal. Conversely, when an operation of a receiving terminal is described, a corresponding transmitting terminal may perform an operation corresponding to the operation of the receiving terminal.

BWP has been introduced to support terminal capability, increase terminal energy efficiency, and support various numerologies. In a communication system supporting FDD, each of up to 4 downlink BWPs and up to 4 uplink BWPs may be configured for each serving cell in the terminal. In a communication system supporting TDD, a BWP pair consisting of a downlink BWP and an uplink BWP may be configured in the terminal. Up to 4 BWP pairs may be configured in the terminal. When a supplementary uplink carrier is configured, four additional uplink BWPs may be configured in the supplementary uplink carrier of the terminal. Even when a plurality of BWPs are configured in the terminal, the terminal may activate one BWP at a preconfigured time (e.g., at a given time). A switching operation between a plurality of BWPs may be indicated by system information, RRC signaling, a timer, a MAC control element (CE), and/or L1 control information.

BWP may be used for sidelink communication. A BWP configured for sidelink communication may be referred to as 'SL BWP'. A UL BWP may be used as an SL BWP. One SL BWP having one numerology may be configured within a sidelink carrier. The terminal may assume that the numerology of the SL BWP is the same as that of an active UL BWP. When the numerology of the active UL BWP is different from that of the SL BWP, the terminal may assume that the SL BWP is deactivated. In addition, unlike a DL BWP and/or UL BWP, a separate signaling operation for activation and/or deactivation of the SL BWP may not be supported. In sidelink communication, terminals having various movement speeds may coexist, and support of various numerologies suitable for terminals having various movement speeds may be required. Since one BWP supporting one numerology can be supported in the existing sidelink communication, operations of configuring and/or supporting multiple SL BWPs may be required to support various numerologies as in downlink and/or uplink. Accordingly, operations of configuring and/or supporting a plurality of SL BWPs for supporting various numerologies in sidelink communication may be introduced. In addition, operations of configuring and/or supporting a plurality of SL BWPs may be introduced for reasons of supporting various terminal capabilities and/or increasing energy efficiency in sidelink. In exemplary embodiments below, methods for supporting configuration and/or operations of a plurality of SL BWPs in sidelink communication will be proposed. The SL BWP may refer to a BWP used for sidelink communication. When an SL BWP is not configured independently from a UL BWP (or DL BWP), and a UL BWP (or DL BWP) is used as an SL BWP, the SL BWP may be interpreted as the UL BWP (or DL BWP) in the exemplary embodiments below.

In order to support operations of configuring and/or supporting a plurality of SL BWPs, a signaling operation for activation/deactivation of one or more SL BWPs and/or a signaling operation for switching between SL BWPs may be required. Accordingly, in the below exemplary embodiments, methods for activation/deactivation of an SL BWP and a method for SL BWP switching will be proposed.

When a separate signaling operation for SL BWP activation/deactivation is not supported, in order to support switching between a plurality of SL BWPs to which a plurality of numerologies (e.g., different numerologies) are applied, and activation and/or deactivation thereof, a plurality of UL BWPs to which a plurality of numerologies (e.g., different numerologies) are applied may be configured, and a mapping relationship between UL BWP and SL BWP may be configured. Based on the mapping relationship between UL BWP and SL BWP, switching, activation, and/or deactivation for an SL BWP may be supported according to switching, activation, and/or deactivation for a UL BWP.

For example, a UL BWP #0 having a subcarrier spacing (SCS) of 15 kHz and a UL BWP #1 having an SCS of 30 kHz may be configured, and an SL BWP #0 having an SCS of 15 kHz and an SL BWP #1 having an SCS of 30 kHz may be configured. The UL BWP #0 may be mapped to the SL BWP #0, and the UL BWP #1 may be mapped to the SL BWP #1. That is, the mapping relationship between the SL BWPs and the UL BWPs may be one-to-one mapping relationship. The switching, activation and/or deactivation operation of the SL BWP #0 may be performed according to the switching, activation and/or deactivation operation of the UL BWP #0, and the switching, activation and/or deactivation operation of the SL BWP #1 may be performed according to the switching, activation, and/or deactivation operation of the UL BWP #1.

For example, when a UL BWP (e.g., operating UL BWP) is switched from the UL BWP #0 to the UL BWP #1, an SL BWP (e.g., operating SL BWP) may be switched from the SL BWP #0 to the SL BWP #1 according to the mapping relationship between the UL BWPs and the SL BWPs. In the switched SL BWP #1, sidelink communication between terminals may be performed. In addition, when a UL BWP activation/deactivation operation is performed, an SL BWP activation/deactivation operation may be performed according to the mapping relationship between the UL BWPs and the SL BWPs. The sidelink communication between terminals may be performed in the activated SL BWP. That is, when a switching, activation, and/or deactivation operation of a UL BWP is performed, a switching, activation, and/or deactivation operation of a corresponding SL BWP may be automatically performed without separate signaling according to the mapping relationship between the UL BWPs and the SL BWPs. A switching operation of an SL BWP may be triggered by performing a switching operation of a corresponding UL BWP, an activation operation of an SL BWP may be triggered by performing an activation operation of a corresponding UL BWP, and a deactivation operation of an SL BWP may be triggered by performing a deactivation operation of a corresponding UL BWP.

The mapping relationship between UL BWP and SL BWP may be one-to-one mapping relationship, n-to-one mapping relationship, or one-to-n mapping relationship. Here, n may be a natural number. The same numerology may be configured to a UL BWP and an SL BWP having the mapping relationship. The mapping relationship (e.g., configuration information of the mapping relationship) between UL BWP and SL BWP may be transmitted using one or a combination of two or more among system information (e.g., cell-specific information), RRC signaling (e.g., UE-specific RRC signaling), a MAC CE, and L1 control information (e.g., downlink control information (DCI) and/or sidelink control information (SCI)). Alternatively, the mapping relationship may be configured implicitly between a UL BWP and an SL BWP to which the same numerology is configured. A mapping relationship between a UL BWP and an SL BWP may be configured by configuring the same ID to the UL BWP and the SL BWP. For example, it may be considered that a mapping relationship is configured between a UL BWP and an SL BWP having the same numerology (e.g., SCS) and the same ID.

Alternatively, a switching, activation, and/or deactivation operation of an SL BWP may be performed through separate signaling as in a DL BWP (or UL BWP). The separate signaling may be one or a combination of two or more among system information signaling, cell-specific RRC signaling, terminal-specific RRC signaling, signaling for timer setting, MAC CE signaling, and L1 control information (e.g., DCI or SCI) signaling. When the L1 control information signaling is used, a BWP indicator indicating execution of an SL BWP switching operation (or, SL BWP activation operation or SL BWP deactivation operation) may be added in DCI (e.g., DCI format 3_0) and/or SCI (e.g., 1st stage SCI and/or 2nd stage SCI) for sidelink scheduling. The first stage SCI may have an SCI format 1-A, and the second stage SCI may have an SCI format 2-A or SCI format 2-B.

Each of DCI and SCI may include a first BWP indicator indicating to perform an SL BWP switching operation, a second BWP indicator indicating to perform an SL BWP activation operation, and/or a third BWP indicator indicating to perform an SL BWP deactivation operation. Information (e.g., offset) indicating an execution time of the SL switching operation (or, SL BWP activation operation or SL BWP deactivation operation) may be configured by system information, an RRC signaling message, and/or a MAC CE. The offset configured by system information, RRC signaling message, and/or MAC CE may be an offset between a slot in which the DCI or SCI indicating to perform the SL switching operation (or, SL BWP activation operation or SL BWP deactivation operation) is received and a slot in which the SL BWP switching operation (or, SL activation operation or SL BWP deactivation operation) is performed. When the DCI and/or SCI indicates to perform the SL switching operation (or, SL BWP activation operation or SL BWP deactivation operation), the SL switching operation (or, SL BWP activation operation or SL BWP deactivation operation) may be performed at the time indicated by the system information, RRC signaling message, and/or MAC CE. That is, the SL switching operation (or, SL BWP activation operation or SL BWP deactivation operation) may be performed in a slot after a preconfigured offset from the slot in which the DCI or SCI is received.

When sidelink communication is performed based on the mode 1, the base station may indicate the terminal to perform the SL BWP switching operation by using the BWP indicator included in the DCI. A transmitting terminal may receive the DCI from the base station, and may identify the BWP indicator included in the DCI. In this case, the transmitting terminal may inform a receiving terminal of the SL BWP switching operation indicated by the base station by transmitting SCI (e.g., first stage SCI and/or second stage SCI) including a BWP indicator (e.g., the BWP indicator included in the DCI). The receiving terminal may receive the SCI from the transmitting terminal, and may determine that the SL BWP switching operation is indicated by the base station by identifying the BWP indicator included in the SCI. The transmitting terminal and/or the receiving terminal may perform the SL BWP switching operation based on the BWP indicator, and sidelink communication between the transmitting terminal and the receiving terminal may be performed in a switched SL BWP. In exemplary embodiments, the transmitting terminal may be a terminal that transmits sidelink data, and the receiving terminal may be a terminal that receives the sidelink data.

When sidelink communication is performed based on the mode 2, a transmitting terminal may autonomously determine whether to perform an SL BWP switching operation. When it is determined to perform the SL BWP switching operation, the transmitting terminal may transmit SCI (e.g., first stage SCI and/or second stage SCI) including a BWP indicator to a receiving terminal. The receiving terminal may receive the SCI from the transmitting terminal, and may determine that execution of the SL BWP switching operation is indicated by identifying the BWP indicator included in the SCI. The transmitting terminal and/or the receiving terminal may perform the SL BWP switching operation based on the BWP indicator, and sidelink communication between the transmitting terminal and the receiving terminal may be performed in a switched SL BWP.

In the existing sidelink communication, a PSCCH on which a first stage SCI is transmitted and a PSSCH (e.g., a PSSCH on which sidelink data scheduled by the first stage SCI is transmitted or a PSSCH on which a second stage SCI associated with the first stage SCI is transmitted) may be mapped to the same slot. A frequency resource assignment for a first subchannel may be configured to be the same as a subchannel in which the SCI is detected, and a time resource assignment for a first slot may be configured to be the same as a slot in which the SCI detected. When one or more SL BWPs are configured and an SL BWP switching operation by SCI is supported, a PSCCH on which a first-stage SCI is transmitted and a PSSCH on which a second-stage SCI and/or data is transmitted may not be configured in the same slot and the same first subchannel (e.g., subchannel having the same index). Accordingly, the first stage SCI may additionally include a slot offset and/or a subchannel offset. The slot offset included in the first stage SCI may be an offset between a slot (e.g., a slot in an existing SL BWP (i.e., SL BWP before switching)) in which a PSCCH on which the corresponding first stage SCI is transmitted is configured and a slot (e.g., a slot in a switched SL BWP) in which a PSSCH associated with the PSCCH (e.g., first stage SCI) is configured. The subchannel offset included in the first stage SCI may be an offset between a subchannel (e.g., a subchannel in the existing SL BWP) in which the PSCCH on which the corresponding first stage SCI is transmitted is configured and a first subchannel (e.g., a subchannel in the switched SL BWP) in which the PSSCH associated with the PSCCH (e.g., first stage SCI) is configured. In exemplary embodiments below, a signaling method(s) of the slot offset and/or subchannel offset will be described.

The slot offset may be preconfigured in consideration of a numerology. An index of the subchannel on which the first stage SCI is transmitted may be configured to be maintained in the switched SL BWP. This operation may be indicated by the subchannel offset. In this case, a separate signaling operation for the subchannel offset may not be required. The BWP indicator, slot offset, and/or subchannel offset may be configured using reserved bits included in the SCI. When the BWP indicator, slot offset, and/or subchannel offset are added in the SCI (e.g., first-stage SCI and/or second-stage SCI) in a situation of coexistence with legacy sidelink terminals, the legacy sidelink terminals cannot detect the BWP indicator, slot offset, and/or subchannel offset included in the SCI, and terminals capable of recognizing the additional information may perform sidelink communication by using the additional information (e.g., BWP indicator, slot offset, and/or subchannel offset) included in the SCI.

An additional indicator (e.g., an indicator having a size of 1 bit) may be required to inform whether or not the terminals capable of recognizing the additional information use the additional information. For example, the indicator set to a first value (e.g., 0) may indicate that the terminals do not need to use the additional information(s), and the indicator set to a second value (e.g., 1) may indicate that the terminals need to use the additional information(s). When the indicator is set to the second value, the terminal may perform an SL BWP switching operation using the additional information (e.g., BWP indicator, slot offset, and/or subchannel offset) included in the SCI.

Alternatively, without the above-described indicator, when a BWP (e.g., SL BWP) indicated by the BWP indicator is different from a current BWP, the terminal may perform an SL BWP switching operation by using additional information (e.g., slot offset and/or subchannel offset). Even when at least one of the BWP indicator, slot offset, and subchannel offset is introduced, the above-described operations may be performed. When numerologies of the SL BWPs are different, a reference unit of each of the slot offset and the subchannel offset may be a numerology of the existing SL BWP or the switched SL BWP. The numerology used as the reference unit may be preconfigured. A smallest numerology or a largest numerology among the numerology of the existing SL BWP and the numerology of the switched SL BWP may be configured to be used as the reference unit.

In order to signal the slot offset and/or subchannel offset in the switched BWP, an existing scheduling method may be used. In the existing sidelink communication, up to N resources (e.g., up to N scheduling resources) may be reserved in advance through SCI. The maximum N resources may include a scheduling resource at a time of receiving the corresponding SCI. Here, N may be a natural number. Based on this, the scheduling resource at the time of receiving of the SCI may be ignored, and resources used for actual data transmission/reception operation in the switched BWP may be from a second scheduling resource according to the corresponding SCI. Slot location information indicating the second scheduling resource in scheduling information included in the SCI may be used as a slot offset from the time of receiving the corresponding SCI. Subchannel location information indicating the second scheduling resource in the scheduling information included in the SCI may be used as an index of a subchannel in the switched BWP.

In the case that the scheduling resource at the time of receiving the SCI is ignored, up to N−1 resources may be reserved. Alternatively, the scheduling resource at the time of receiving the SCI may be used for data transmission/reception operation in the existing SL BWP (e.g., SL BWP before switching), and a resource used for data transmission/reception operation in the switched SL BWP may be from the second scheduling resource according to the SCI. In this case, like the existing sidelink communication, a maximum of N resources may be reserved by the SCI. Alternatively, the scheduling resource at the time of receiving the SCI may be used only for data transmission/reception operation in the switched SL BWP. In this case, a time at which the scheduling resource is applied may be signaled separately at the time of receiving the SCI. Alternatively, the time at which the scheduling resource is applied may be a time at which a preconfigured slot offset is applied. If SL BWP configurations including the numerologies of the SL BWPs are different, a preconfigured one numerology (or, a smallest numerology or a largest numerology) of the numerology of the existing SL BWP and the numerology of the switched SL BWP may be applied to various information (e.g., size and number of subchannels, slot offset, subchannel offset, and reference unit) between reserved resources in the reserved resource information. In this case, when the number of subchannels between the BWP before switching and the switched BWP is different, a signaling operation may be performed based on the number of bits of an information size in consideration of the number of subchannels of the BWP before switching. After that, the corresponding information may be truncated from the MSB to fit the information size in consideration of the number of subchannels of the switched BWP. Alternatively, the information may be interpreted by applying padding (e.g., 0) to the MSB to fit the information size in consideration of the number of subchannels of the switched BWP. The terminal may receive scheduling information for reserving N resources. In this case, when a BWP indicator is present in the SCI and a BWP indicated by the BWP indicator is different from a current BWP, the terminal may perform the aforementioned SL BWP switching operation.

When a current carrier is not an independent SL carrier (e.g., independent sidelink carrier), some of uplink (UL) resources may be configured as sidelink (SL) resources. A bitmap having a specific length may be repeatedly applied to the remaining slots excluding slot(s) in which at least X or more UL symbols are not configured and slot(s) in which sidelink SSB (S-SSB) is transmitted among slots within a specific period. Here, X may be a natural number. The bitmap may include one or more bits, and a slot mapped to a bit set to 1 may be used as an SL resource. For example, within a period of 10240 slots composed of slots to which an SCS of 15 kHz is applied, the S-SSB may be transmitted according to a periodicity of 160 ms, and two slots used for transmission of the S-SSB may exist within a period of the S-SSB. In this case, the number of slots used for transmission of the S-SSB may be 128 within a period of 10240 slots.

When the length of the bitmap is 10, the SL resources may be configured by continuously applying the bitmap having the size of 10 bits within a period of 10240 slots. Here, it may be assumed that X or more UL symbols are configured in each of 10240 slots. In order to divide the number of available slots within a period of 1024 slots by the length (e.g., size) of the bitmap without a remainder, two spare slots may be required. Within a period of 10240 slots, the bitmap may be applied 1011 (i.e., (10240-128-2)/10) times. When the bitmap is set to '1111000000', a slot mapped to a bit set to 1 may be used as an SL resource. Therefore, 4044 slots may be configured as SL resources. 4044 slots of the 10240 slots may be used for sidelink communication through SL resource pool configuration.

When a DL/UL BWP switching operation is performed, a delay time may occur. When a DL BWP switching operation is performed, the terminal may perform a DL reception operation in a switched DL BWP after a delay time (hereinafter, referred to as '$T_1$'). When a UL BWP switching operation is performed, the terminal may perform a UL transmission operation in a switched UL BWP after $T_1$. When some of UL resources are configured as SL resources, the terminal should be able to perform UL transmission in a slot after $T_1$ from a triggering time of the UL BWP switching operation. The SL resources may be configured in consideration of the above-described operation. Accordingly, in exemplary embodiments below, methods of configuring SL resources according to a UL BWP switching operation in various cases including a case in which a mapping relationship between UL BWP and SL BWP is configured will be described. When a UL BWP switching operation is performed, the terminal should be able to perform UL transmission in a switched BWP after $T_1$ for the UL BWP switching operation. The following various cases may be considered according to the configuration of the mapping relationship between UL BWP and SL BWP and/or the numerology in each BWP.

Case 1: UL BWP switching occurs→SL BWP switching occurs→Configuration of SL resources within UL resources is necessary Case 2: UL BWP switching occurs→SL BWP switching occurs→Configuration of SL resources within UL resources is unnecessary when UL resources and SL resources are configured independently Case 3: Only UL BWP switching occurs (e.g., SL BWP switching does not occur)→a numerology of a new UL BWP (e.g., switched UL BWP) is the same as a numerology of an existing SL BWP (e.g., SL BWP before switching)→Configuration of SL resources within UL resources is unnecessary when UL resources and SL resources are configured independently Case 4: Only UL BWP switching occurs (e.g., SL BWP switching does not occur)→a numerology of a new UL BWP (e.g., switched UL BWP) is different from a numerology of an existing SL BWP (e.g., SL BWP before switching)→SL BWP deactivation In Case 1 and Case 2, a mapping relationship between UL BWP and SL BWP may be configured, and an SL BWP switching operation may be automatically performed as a corresponding UL BWP switching occurs. As in Case 1, if configuration of SL resources within UL resources is necessary after the BWP switching operation is performed, in order to ensure UL transmission of the terminal in the switched BWP after $T_1$ for BWP switching, a delay time of SL resource configuration (Hereinafter, '$T_2$') may be added.

Figure 10:
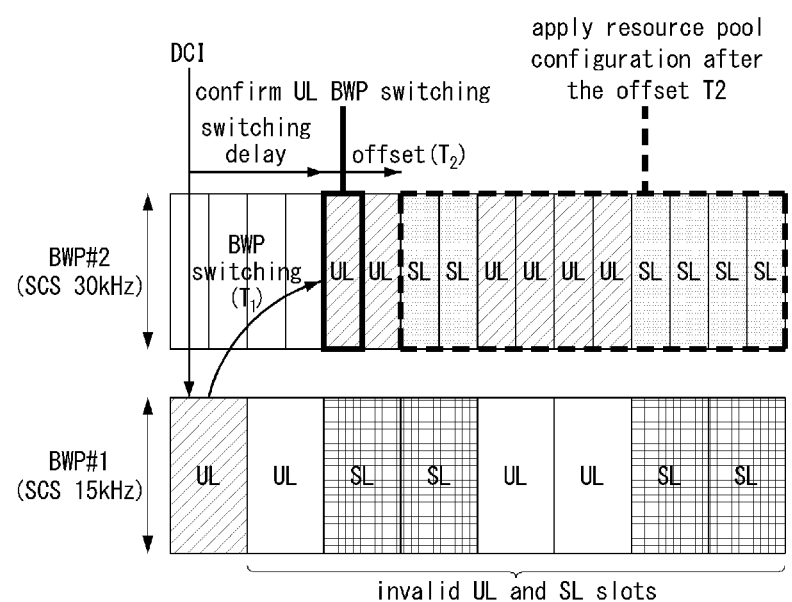
FIG. 10 is a conceptual diagram illustrating a first exemplary embodiment of a communication method according to Case 1.

FIG. 10 is a conceptual diagram illustrating a first exemplary embodiment of a communication method according to Case 1.

Referring to FIG. 10, a BWP switching operation from a UL BWP #1 to a UL BWP #2 may be performed, a mapping relationship between the UL BWP #1 and an SL BWP #1 may be configured, and a mapping relationship between the UL BWP #2 and an SL BWP #2 may be configured. The SL BWP #1 may be configured to be the same as the UL BWP #1, and the SL BWP #2 may be configured to be the same as the UL BWP #2. When the BWP switching operation from the UL BWP #1 to the UL BWP #2 is performed, a BWP switching operation from the SL BWP #1 to the SL BWP #2 may be automatically performed. When configuration of SL resources within UL resources is required in the switched BWP, the configuration of SL resources may be applied after $T_2$ to ensure UL transmission of the terminal in the switched BWP. Alternatively, the configuration of SL resources may be applied after $T_1$ in the switched BWP, but the configuration of SL resources may be ignored during $T_2$ to ensure UL transmission. That is, the terminal may perform UL transmission during $T_2$ in the switched BWP.

In case 2, the UL resources and the SL resources may be independently configured. Since configuration of SL resources within UL resources after BWP switching occurs is unnecessary, additional configuration of $T_2$ for configuration of SL resources after BWP switching (e.g., after $T_1$) may not be required. In the independently-configured UL resources and SL resources, the terminal may simultaneously perform UL and SL transmission operations. In this case, the terminal may simultaneously perform a UL transmission operation in the switched UL BWP after BWP switching (e.g., after $T_1$) and an SL transmission operation (e.g., PSCCH and/or PSSCH transmission operation) in the SL BWP (e.g., switched BWP). When a sum of a transmission power for the UL transmission and a transmission power for the SL transmission exceeds a maximum transmission power (e.g., allowable transmission power), a transmission power may be preferentially allocated to the UL transmission. Alternatively, transmission power may be preferentially allocated according to the priority of the UL transmission or the SL transmission. The same SCS may be applied in the UL BWP and SL BWP in which the simultaneous transmission operation is performed.

On the other hand, simultaneous transmission of UL and SL may not be possible due to capability of the terminal. In this case, in order to ensure UL transmission in the switched BWP, SL resources may be configured as invalid resources during a delay time (hereinafter referred to as '$T_3$') to ensure UL transmission of the terminal after $T_1$ for BWP switching. Alternatively, the UL transmission may be performed preferentially among the UL transmission and the SL transmission during $T_3$.

In Cases 3 and 4, the mapping relationship between UL BWP and SL BWP may not be configured. Therefore, even when a UL BWP switching occurs, an SL BWP switching operation may not occur. When a numerology of a switched UL BWP is different from that of an existing SL BWP as in Case 4, the SL BWP is deactivated, so that an additional operation to ensure UL transmission in the switched UL BWP may be unnecessary. When a numerology of the switched UL BWP is the same as that the existing SL BWP as in Case 3, the existing SL BWP may be maintained in the active state. In this case, as in Case 2, the terminal supporting simultaneous UL and SL transmission operations may simultaneously perform a UL transmission operation in the UL BWP and an SL transmission operation (e.g., PSCCH and/or PSSCH transmission operation) in the SL BWP.

When a sum of a transmission power for UL transmission and a transmission power for SL transmission exceeds a maximum transmission power (e.g., allowable transmission power), a transmission power may be preferentially allocated to the UL transmission. Alternatively, transmission power may be preferentially allocated according to the priority of the UL transmission or the SL transmission. On the other hand, the simultaneous transmission operation of UL and SL may not be possible due to the capability of the terminal. In this case, it may be necessary to configure $T_3$ to ensure the UL transmission in the switched UL BWP.

Figure 11:
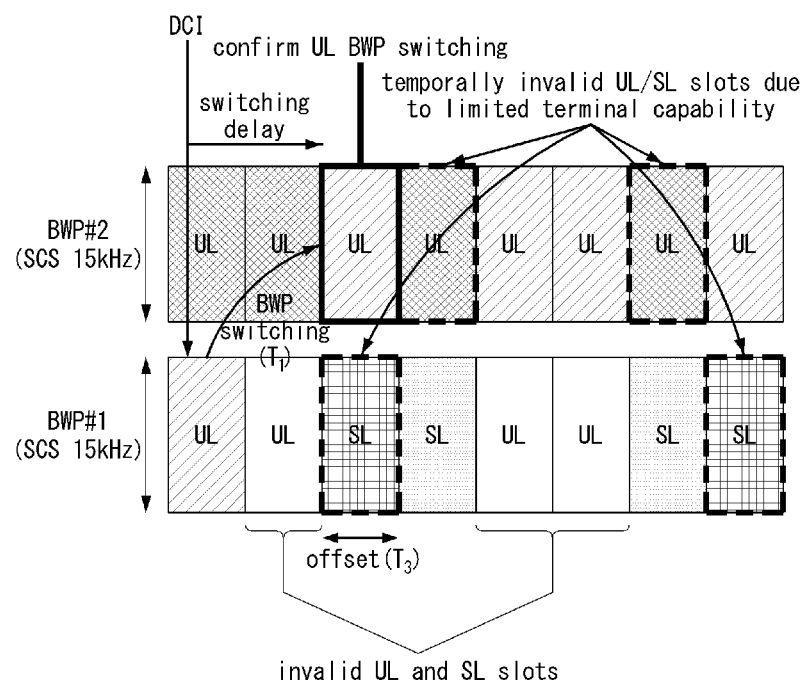
FIG. 11 is a conceptual diagram illustrating a first exemplary embodiment of a communication method according to Case 3.

FIG. 11 is a conceptual diagram illustrating a first exemplary embodiment of a communication method according to Case 3.

Referring to FIG. 11, a BWP switching operation from a UL BWP #1 to a UL BWP #2 may be performed, and a mapping relationship between UL BWP and SL BWP may not be configured. In this case, since a numerology of a switched UL BWP (i.e., UL BWP #2) is the same as that of an existing SL BWP (i.e., UL BWP #1), the existing SL BWP may not be deactivated. That is, the SL BWP may be maintained in the activated state. The terminal may not simultaneously perform an SL transmission operation in the UL BWP #1 and a UL transmission operation in the UL BWP #2. In this case, in order to ensure a UL transmission operation of the terminal in the switched UL BWP (i.e., UL BWP #2), it may be necessary to configure SL resources as invalid resources during $T_3$ in the UL BWP #1. Alternatively, a priority of UL transmission during $T_3$ may be configured to be higher than that of SL transmission. When UL transmission and SL transmission occur at the same time after $T_3$, the terminal may compare the priority of UL transmission and the priority of SL transmission for each transmission, and may perform a transmission having a higher priority (e.g., UL transmission or SL transmission).

The additional delay time (e.g., $T_2$ or $T_3$) for ensuring UL transmission in the UL BWP switched after $T_1$ for BWP switching may be configured identically or differently. The additional delay time may be preconfigured as a specific value(s). The additional delay time may be configured by one or a combination of two or more among system information signaling, cell-specific RRC signaling, UE-specific RRC signaling, signaling for timer setting, MAC CE signaling, and L1 control information (e.g., DCI or SCI) signaling.

When a current carrier is not an independent SL carrier, some of UL resources may be configured as SL resources. In order to configure SL resources within available UL resources, a bitmap may be repeatedly applied within a specific period. A slot mapped to a bit set to 1 in the bitmap may be configured as an SL resource. A plurality of SL resource pools in the BWP may be configured according to a transmission mode or various reasons. When there are a plurality of BWPs (e.g., a plurality of SL BWPs), a method of configuring SL resource pools for the plurality of SL BWPs may be required.

In each of the plurality of BWPs, the SL resource pool may be configured through separate signaling. When the SL resource pool is independently configured in each of the plurality of BWPs through separate signaling, flexible SL resource configuration may be possible according to a situation of each of the plurality of BWPs. Accordingly, resources may be used efficiently. However, a signaling overhead for configuring the SL resource pools may increase.

Alternatively, a reference BWP may be configured, and SL resource pool configuration based on the reference BWP may be applied to another BWP. In this case, the SL resource pool configuration may be the same in the plurality of BWPs. Therefore, a switching operation between the BWPs may be easily performed. A signaling overhead when the SL resource pool configurations are the same may be smaller than a signaling overhead when the SL resource pool configurations are different in the plurality of BWPs.

When the SL resource pool configuration based on the reference BWP is applied to the plurality of BWPs, and numerologies are different in the plurality of BWPs, the SL resource pool may be configured in consideration of a ratio among numerologies of the plurality of SL resource pools. For example, when the reference BWP (e.g., BWP #1) has a numerology (e.g., SCS) of 15 kHz, and another BWP (e.g., BWP #2) has a numerology of 30 kHz, a ratio between the numerologies of the BWP #1 and BWP #2 may be 2 (i.e., 30 kHz/15 kHz=$2^{(\mu2-\mu1)}=2^{(2-1)}$. $\mu$ may indicate the numerology. The value of the ratio of the numerologies (i.e., 2) may be configured as the number of repetitions for the value of each bit of the bitmap, which is configuration information of the SL resource pool of the BWP #1. This operation may be applied to the SL resource pool configuration of the BWP #2. In this case, the reference BWP may be configured as a BWP having the smallest numerology among the plurality of BWPs.

Figure 12:
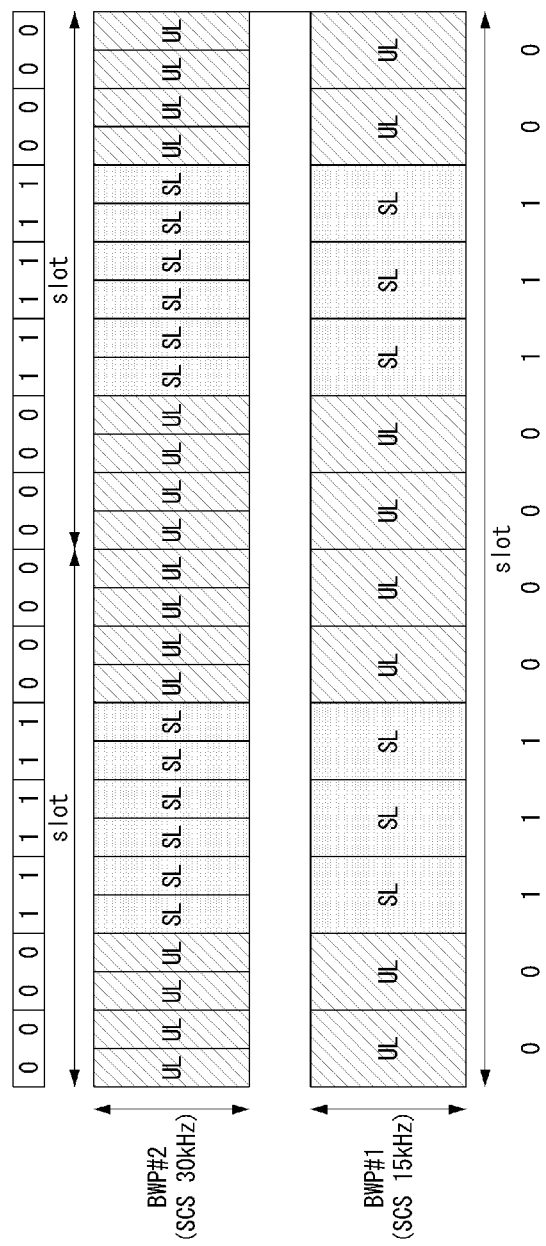
FIG. 12 is a conceptual diagram illustrating a first exemplary embodiment of different BWPs to which the same SL resource pool configuration is applied.

FIG. 12 is a conceptual diagram illustrating a first exemplary embodiment of different BWPs to which the same SL resource pool configuration is applied.

Referring to FIG. 12, a BWP #1 may be a reference BWP, and a bitmap (i.e., first bitmap) for SL resource pool configuration of the BWP #1 may be '00111000011100'. In this case, since a ratio between numerologies of the BWP #1 and a BWP #2 is 2, a bitmap (i.e., second bitmap) configured as '0000111111000000001111110000' may be generated by repeating the respective bit values of the bitmap (i.e., first bitmap) twice. An SL resource pool of the BWP #2 may be configured based on the corresponding bitmap (i.e., '0000111111000000001111110000').

According to switching, activation, and/or deactivation operations of the BWP(s), resources may be efficiently used in various situations. By configuring a plurality of SL resource pools within one BWP, resources may be used efficiently. SL resource pool(s) used for transmission/reception operations in sidelink communication may be configured for each terminal. The SL resource pool used for sidelink data transmission may be a TX resource pool, and one or more TX resource pools may be configured. The SL resource pool used for sidelink data reception may be an RX resource pool, and one or more RX resource pools may be configured.

Since an RX resource pool for adjacent cells and an RX resource pool for out-of-coverage terminal(s) are required as well as the RX resource pool for one cell, the number of RX resource pools may be configured to be higher than the number of TX resource pools. A modulation and coding scheme (MCS) table and/or a demodulation-reference signal (DM-RS) pattern for each of the SL resource pools (e.g., TX resource pool, RX resource pool) may be configured. In each of the SL resource pools, a separate MCS table and/or DM-RS pattern may be configured according to a channel state and/or a service requirement. A suitable SL resource pool suitable for sidelink transmission may be configured, and a resource region for PSCCH and/or PSSCH transmission may be scheduled within the SL resource pool. A transmitting terminal may perform PSCCH and/or PSSCH transmission in the scheduled resource region.

A plurality of SL resource pools may be configured, and a specific SL resource pool(s) within the plurality of SL resource pools may be dynamically selected for sidelink transmission. In this case, a resource region of a PSCCH and/or PSSCH may be scheduled within the selected SL resource pool. When there are a plurality of SL resource pools, ambiguity may occur with respect to the scheduling information of the PSCCH and/or PSSCH.

The size of scheduling information of the time and frequency resource regions may vary depending on the number of slots and/or the number of subchannels in which sidelink data can be transmitted/received. The above-described parameters (e.g., size and/or number) may be different for each SL resource pool. A position of the available slot(s) and/or a frequency start position of the subchannel(s) may be different for each SL resource pool. Even when the scheduling information has the same size, the position of the actual resource region indicated by the corresponding scheduling information may be different in the respective SL resource pools. A plurality of SL resource pools may overlap in the time domain and/or the frequency domain. In this case, if the SL resource pool indicated by the scheduling information of the PSCCH and/or PSSCH is not explicitly known, the above-described problem (e.g., ambiguity problem) may occur.

When the PSCCH and/or PSSCH resource region is scheduled by DCI (e.g., DCI format 3_0), the DCI may further include information indicating an index of the SL resource pool in order to solve the aforementioned ambiguity problem. The SL resource pool indicated by the DCI may be an SL resource pool to which sidelink scheduling information included in the DCI is applied. The transmitting terminal may receive the DCI from the base station, identify the index of the SL resource pool included in the DCI, and apply the scheduling information of the time and frequency resource region included in the DCI to the identified SL resource pool, thereby identifying the position of the time and frequency resource region to be used for PSCCH and/or PSSCH transmission. The transmitting terminal may perform PSCCH and/or PSSCH transmission using the identified time and frequency resource region. In this case, the transmitting terminal may transmit SCI including information on the resource region scheduled for sidelink communication to the receiving terminal. Even in this case, an ambiguity problem may occur between the plurality of SL resource pools in the receiving terminal. To solve this problem, the SCI may further include information indicating the index of the SL resource pool. The SL resource pool indicated by the SCI may be an SL resource pool to which the sidelink scheduling information included in the corresponding SCI is applied.

For example, ceiling(log $2(N_{pools})$) bits may be added to the SCI (e.g., a first stage SCI (e.g., SCI format 1-A) and/or a second stage SCI), and the added bit(s) may be used to indicate the index of the SL resource pool. $N_{pools}$ may indicate the number of TX resource pools. When configuration of up to 8 TX resource pools is possible, the maximum size of bits added to the SCI may be 3 bits. When the maximum number of configurable TX resource pools increases, the maximum size of bits added to the SCI may also increase.

The information included in the DCI and/or SCI may indicate the index of the SL resource pool (e.g., TX resource pool). The transmitting terminal may transmit sidelink data through the TX resource pool configured by the DCI and/or SCI. The receiving terminal may receive the sidelink data through the RX resource pool. Even when the SL resource pool indicated by the information included in the DCI and/or SCI is not distinguished between the TX resource pool or the RX resource pool, in order to prevent the problem of ambiguity between the TX resource pool of the transmitting terminal and the RX resource pool of the receiving terminal from occurring, a mapping relationship between TX resource pool and RX resource pool may be configured. For example, a time and frequency resource region of the TX resource pool #0 may be configured to be the same as a time and frequency resource region of the RX resource pool #0. When desiring to transmit sidelink data in the TX resource pool #0, the transmitting terminal may transmit SCI (e.g., first stage SCI and/or second stage SCI) including information indicating the TX resource pool #0, and transmit the sidelink data in the TX resource pool #0. The receiving terminal may receive the SCI from the transmitting terminal, and may identify an index of the TX resource pool indicated by the SCI. When the SCI indicates the TX resource pool #0, the receiving terminal may receive the sidelink data in the RX resource pool #0 mapped to the TX resource pool #0 (e.g., the time and frequency resource region in the RX resource pool #0, that is indicated by the scheduling information included in the SCI) from the transmitting terminal. When the TX resource pool and the RX resource pool having the same index are configured (e.g., implicitly configured) in the same time and frequency resource region, the ambiguity problem in the scheduling signaling for transmission of sidelink data between the transmitting terminal and the receiving terminal may be solved.

By configuring the TX resource pool and the RX resource pool in the same time and frequency resource region within the same cell, the ambiguity problem between the transmitting terminal and the receiving terminal may be solved. However, it may be difficult to apply the above-described method(s) to the RX resource pool for receiving data from adjacent cell(s) and/or data from out-of-coverage terminal(s).

Figure 13:
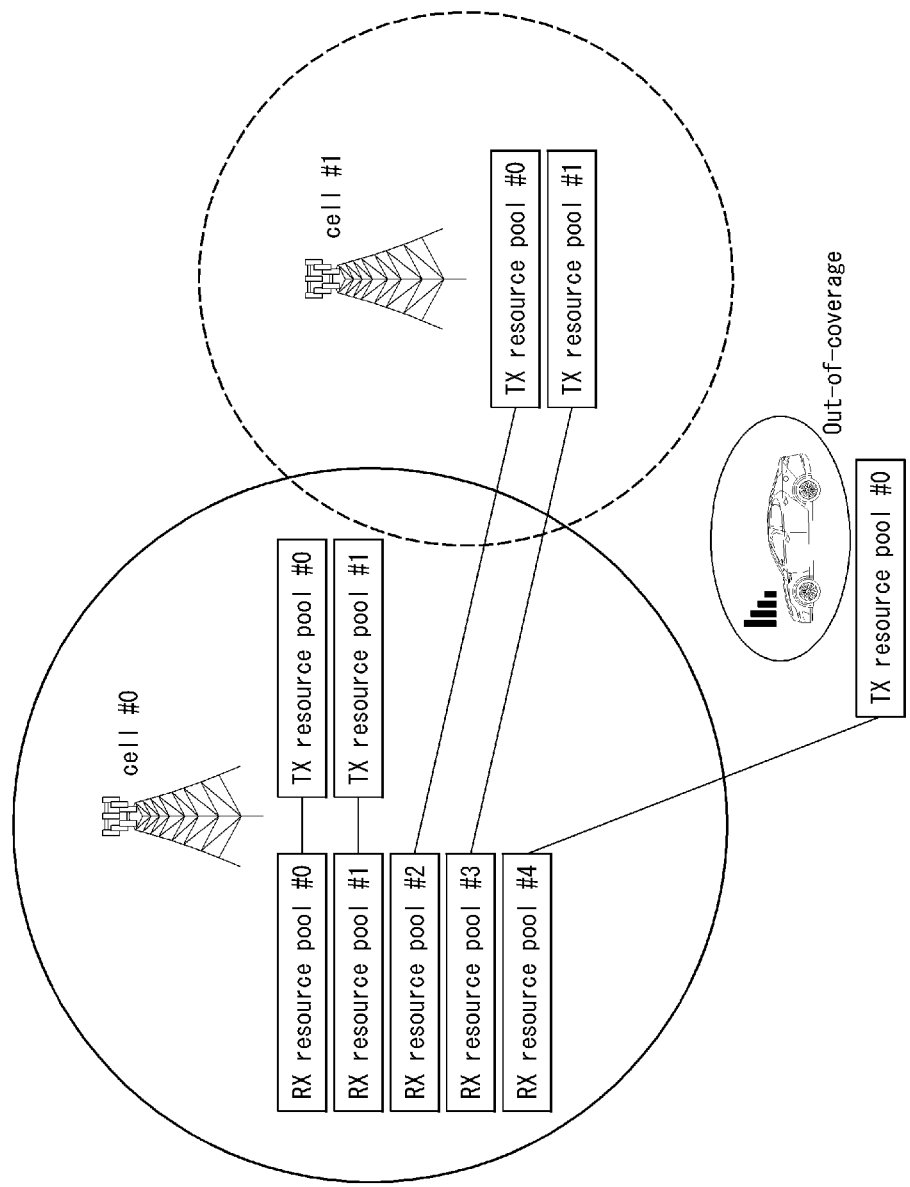
FIG. 13 is a conceptual diagram illustrating a first exemplary embodiment of a method of configuring an SL resource pool in adjacent cell(s) and out-of-coverage terminal(s).

FIG. 13 is a conceptual diagram illustrating a first exemplary embodiment of a method of configuring an SL resource pool in adjacent cell(s) and out-of-coverage terminal(s).

Referring to FIG. 13, 5 RX resource pools and 2 TX resource pools may be configured in a cell #0. In the cell #0, an RX resource pool #0 may be associated (e.g., mapped) with a TX resource pool #0, and an RX resource pool #1 may be associated with a TX resource pool #1. An RX resource pool #2 of the cell #0 may be associated with a TX resource pool #0 of a cell #1 that is an adjacent cell, and an RX resource pool #3 of the cell #0 may be associated with a TX resource pool #1 of the cell #1. An RX resource pool #4 of the cell #0 may be associated with a TX resource pool #0 of an out-of-coverage terminal.

A transmitting terminal of the cell #1 may transmit sidelink data through the TX resource pool #1 of the cell #1. In this case, an SL resource pool index included in SCI transmitted by the transmitting terminal of the cell #1 may be set to 1. The RX resource pool #1 of the cell #0 may be associated with the TX resource pool #1 of the cell #0, and an RX resource pool associated with the TX resource pool #1 of the cell #1 may be the RX resource pool #3 of the cell #0. Accordingly, when the transmitting terminal of the cell #1 sets the SL resource pool index based on the TX resource pool, an index of the RX resource pool interpreted based on the SL resource pool index included in the SCI may be different from an index of an RX resource pool used for actually receiving sidelink data.

In order to solve the above-described ambiguity problem, a mapping relationship between TX resource pool and RX resource pool may be configured explicitly. For example, in a step of configuring an SL resource pool for sidelink communication between a terminal belonging to the cell #0 and a terminal belonging to the cell #1, configuration information indicating that the TX resource pool #1 of the cell #1 is mapped to the RX resource pool #3 of the cell #0 may be generated/transmitted. The above-described configuration information may be indicated by one or a combination of two or more among system information signaling, cell-specific RRC signaling, UE-specific RRC signaling, MAC CE signaling, and L1 control information signaling. For example, configuration parameter(s) of the resource pool (e.g., SL resource pool) may include information of SL resource pool(s) of adjacent cell(s), TDD configuration information of adjacent cell(s), synchronization-related information of adjacent cell(s), and/or index(es) of SL resource pool(s) (e.g., TX resource pool(s) or RX resource pool(s)) mapped to SL resource pool(s) of adjacent cell(s).

Even when configuration information indicating a mapping relationship between TX resource pool and RX resource pool is explicitly signaled, it may be necessary to clearly distinguish TX resource pool index(es) detectable in a specific RX resource pool between cells. For example, in the exemplary embodiment shown in FIG. 13, a mapping relationship between the RX resource pool #2 of the cell #0 and the TX resource pool #0 of the cell #1 may be configured, and a resource region of the RX resource pool #2 may overlap with a resource region of the RX resource pool #0 of the cell #0, that is mapped to the TX resource pool #0 of the cell #0. In this case, when 'TX resource pool index=0' is detected in SCI received in the overlapped resource region, it may be difficult for the receiving terminal to identify whether received sidelink data is sidelink data transmitted by a terminal of the cell #1 or sidelink data transmitted by a terminal of the cell #0.

Therefore, when an RX resource pool is mapped to (e.g., associated with) a TX resource pool of adjacent cell(s), it may be preferable to configure such that a TX resource pool index identical to a TX resource pool index of adjacent cell(s) is not received in the corresponding RX resource pool from the same cell. A resource region of an RX resource pool (e.g., RX resource pool #2 and/or #3) associated with a TX resource pool of adjacent cell(s) may be configured so as not to overlap with a resource region of an RX resource pool (e.g., RX resource pool #0 and/or #1) associated with a TX resource pool of the same cell, thereby solving the above-described problem.

When configuration information of a mapping relationship between TX resource pool and RX resource pool is signaled, interpretation of an SL resource pool index may be performed according to the mapping relationship. Even when a mapping relationship between TX resource pool and RX resource pool is not separately configured, the receiving terminal may always recognize sidelink data received in the corresponding RX resource pool as sidelink data from an adjacent cell. In this case, the receiving terminal may ignore an SL resource pool index indicated by a control channel (e.g., DCI and/or SCI), and may receive sidelink data in consideration of only RX resource pool configuration.

Alternatively, a mapping relationship between SL resource pools may be configured in consideration of preconfigured constraints. For example, up to 8 TX resource pools may be configurable, and an index of each of the 8 TX resource pools may be set to one value from 0 to 7. In addition, a maximum of 16 RX resource pools may be configurable, and an index of each of the 16 RX resource pools may be set to one value from 0 to 15. In this case, RX resource pool indexes #0 to #7 may be mapped to TX resource pools of the same cell. RX resource pool indexes #8 to #15 may be recognized as corresponding to RX resource pools of adjacent cell(s), and a TX resource pool index indicated by control information detected in the corresponding RX resource pool may be interpreted as a TX resource pool index of a TX resource pool of an adjacent cell according to a preconfigured mapping relationship. The receiving terminal may obtain scheduling information and/or sidelink data based on the above-described interpretation.

The number of configurable TX resource pools and RX resource pools may be configured within a maximum number according to a situation of the system. RX resource pools other than RX resource pools corresponding to TX resource pools configured within the same cell may be configured as RX resource pools for adjacent cell(s) and/or for special purpose(s). A TX resource pool indicated by control information detected in the corresponding RX resource pool may be interpreted regardless of a TX resource pool index of the same cell. That is, a TX resource pool indicated by the control information may be interpreted as a TX resource pool for adjacent cell(s) and/or special purpose(s). The TX resource pool indicated by the control information may not be considered in a step of receiving sidelink data.

Alternatively, an SL resource pool of adjacent cell(s) and/or an SL resource pool for sidelink communication of out-of-coverage terminal(s) may be configured independently (or separately) from other resource pools. In addition, a common SL resource pool may be configured, and sidelink communication may be performed in the common SL resource pool. In this case, a method(s) indicating whether sidelink communication in the common SL resource pool is sidelink communication of adjacent cell(s) or sidelink communication of out-of-coverage terminal(s) may be used.

Figure 14:
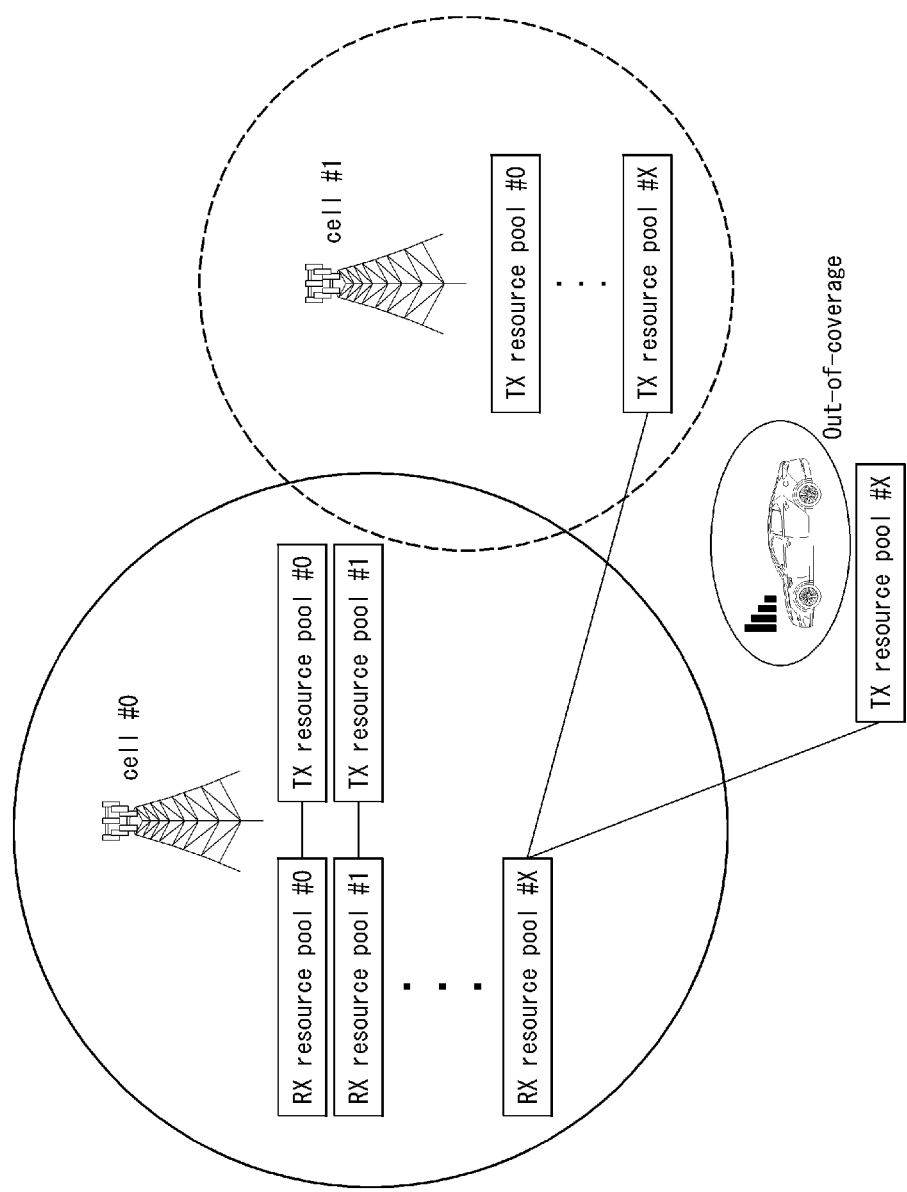
FIG. 14 is a conceptual diagram illustrating a second exemplary embodiment of a method of configuring an SL resource pool in adjacent cell(s) and out-of-coverage terminal(s).

FIG. 14 is a conceptual diagram illustrating a second exemplary embodiment of a method of configuring an SL resource pool in adjacent cell(s) and out-of-coverage terminal(s).

Referring to FIG. 14, a specific SL resource pool (e.g., SL resource pool #X) for sidelink communication of adjacent cell(s) or sidelink communication of out-of-coverage terminal(s) may be configured. The specific SL resource pool may be configured in common for both adjacent cell(s) and out-of-coverage terminal(s). The specific SL resource pool may refer to a common SL resource pool. When a common SL resource pool (e.g., SL resource pool #X) is configured for all terminals performing sidelink communication, configuration of a mapping relationship between TX resource pool and RX resource pool in adjacent cell(s) or a mapping relationship between TX resource pool and RX resource pool in out-of-coverage terminal(s) may not be required. That is, sidelink communication may be performed without signaling configuration information of the mapping relationship between TX resource pool and RX resource pool.

The common SL resource pool may be configured within the cell separately (or independently) from the SL resource pool for sidelink communication and/or the SL resource pool for other purpose(s). A resource region of the common SL resource pool may be configured so as not to overlap with a resource region of the SL resource pool for sidelink communication and/or the SL resource pool for other purpose(s). In this case, even when sidelink communication is scheduled without an indication of an SL resource pool index, sidelink data detected in the common SL resource pool may be recognized as sidelink data transmitted by a terminal of an adjacent cell or an out-of-coverage terminal.

In the exemplary embodiment shown in FIG. 14, the common SL resource pool may be configured for both a terminal of an adjacent cell and an out-of-coverage terminal. The common SL resource pool for sidelink communication of adjacent cell(s) (e.g., SL resource pool #X) and a separate common SL resource pool for sidelink communication of out-of-coverage terminal(s) (e.g., SL resource pool #Y) may be respectively configured. The common SL resource pool may be preconfigured. Alternatively, configuration information of the common SL resource pool may be transmitted using one or a combination of two or more among system information signaling, cell-specific RRC signaling, UE-specific RRC signaling, S-SSB signaling, MAC CE signaling, and L1 control information signaling. An out-of-coverage terminal may identify the common SL resource pool by receiving an S-SSB. That is, an S-SSB may be used to indicate the common SL resource pool.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first terminal in a communication system, the operation method comprising:
   generating sidelink control information (SCI) including a sidelink (SL) bandwidth part (BWP) indicator;
   transmitting the SCI to a second terminal in a first SL BWP;
   performing a SL switching operation from the first SL BWP to a second SL BWP indicated by the SL BWP indicator included in the SCI; and
   performing sidelink transmission with the second terminal in the second SL BWP,
   wherein the SCI further includes a slot offset, and the slot offset is an offset between a slot in which the SCI is transmitted and a slot in which the sidelink transmission associated with the SCI is performed,
   wherein when a first numerology of the first SL BWP is different from a second numerology of the second SL BWP, the slot offset is configured based on the first numerology or the second numerology.

2. The operation method according to claim 1, further comprising, when the sidelink transmission is performed based on a mode 1, receiving downlink control information (DCI) including the SL BWP indicator from a base station.

3. The operation method according to claim 1, wherein when the sidelink transmission is performed based on a mode 2, whether to perform the SL switching operation is autonomously determined by the first terminal.

4. The operation method according to claim 1, wherein the SCI further includes a subchannel offset, and the subchannel offset is an offset between a subchannel in which the SCI is transmitted and a first subchannel in which the sidelink transmission associated with the SCI is performed.

5. The operation method according to claim 4, wherein when the first numerology of the first SL BWP is different from the second numerology of the second SL BWP, the subchannel offset is configured based on the first numerology or the second numerology.

6. The operation method according to claim 1, further comprising receiving an offset indicating an execution time of the SL switching operation from the base station, wherein the SL switching operation is performed in a slot after the offset from a slot in which the SCI is received.

7. The operation method according to claim 1, wherein an SL resource pool is configured based on a reference BWP, and when a reference numerology of the reference BWP is different from the second numerology of the second SL BWP, the SL resource pool is applied to the second SL BWP in consideration of a ratio between the reference numerology and the second numerology.

8. The operation method according to claim 1, wherein the SL switching operation is performed in a slot after an offset configured in consideration of a numerology.

9. An operation method of a first terminal in a communication system, the operation method comprising:
   generating sidelink control information (SCI) including a sidelink (SL) bandwidth part (BWP) indicator;
   transmitting the SCI to a second terminal in a first SL BWP;
   performing a SL switching operation from the first SL BWP to a second SL BWP indicated by the SL BWP indicator included in the SCI; and
   performing sidelink transmission with the second terminal in the second SL BWP,
   wherein an SL resource pool is configured based on a reference BWP, and when a first numerology of the reference BWP is different from a second numerology of the second SL BWP, the SL resource pool is applied to the second SL BWP in consideration of a ratio between the first numerology and the second numerology.

10. An operation method of a first terminal in a communication system, the operation method comprising:
   generating sidelink control information (SCI) including a sidelink (SL) bandwidth part (BWP) indicator;
   transmitting the SCI to a second terminal in a first SL BWP;
   performing a SL switching operation from the first SL BWP to a second SL BWP indicated by the SL BWP indicator included in the SCI; and
   performing sidelink transmission with the second terminal in the second SL BWP,
   wherein the SCI further includes a subchannel offset, and the subchannel offset is an offset between a subchannel in which the SCI is transmitted and a first subchannel in which the sidelink transmission associated with the SCI is performed,
   wherein when a first numerology of the first SL BWP is different from a second numerology of the second SL BWP, the subchannel offset is configured based on the first numerology or the second numerology.

* * * * *